United States Patent
Tsuda et al.

(10) Patent No.: US 10,069,310 B2
(45) Date of Patent: Sep. 4, 2018

(54) WIRELESS POWER TRANSMISSION APPARATUS AND SUPPLY POWER CONTROL METHOD OF WIRELESS POWER TRANSMISSION APPARATUS

(71) Applicant: NITTO DENKO CORPORATION, Ibaraki-shi, Osaka (JP)

(72) Inventors: Hisashi Tsuda, Ibaraki (JP); Takezo Hatanaka, Ibaraki (JP)

(73) Assignee: NITTO DENKO CORPORATION, Ibarak-shi (JP)

(*) Notice: Subject to any disclaimer, the term of this patent is extended or adjusted under 35 U.S.C. 154(b) by 229 days.

(21) Appl. No.: 14/904,147

(22) PCT Filed: May 28, 2014

(86) PCT No.: PCT/JP2014/064091
§ 371 (c)(1),
(2) Date: Jan. 11, 2016

(87) PCT Pub. No.: WO2015/005008
PCT Pub. Date: Jan. 15, 2015

(65) Prior Publication Data
US 2016/0141885 A1 May 19, 2016

(30) Foreign Application Priority Data
Jul. 9, 2013 (JP) .................. 2013-143293

(51) Int. Cl.
*H02J 5/00* (2016.01)
*H02J 7/02* (2016.01)
(Continued)

(52) U.S. Cl.
CPC ............ *H02J 5/005* (2013.01); *H02J 7/0083* (2013.01); *H02J 7/025* (2013.01); *H02J 50/12* (2016.02); *H02J 50/50* (2016.02)

(58) Field of Classification Search
CPC ........ H02J 5/005; H02J 7/0077; H02J 7/0081; H02J 7/0083; H02J 7/0086; H02J 7/025;
(Continued)

(56) References Cited

U.S. PATENT DOCUMENTS 5,843,077 A * 12/1998 Edwards ............ A61B 18/1477
128/898
6,554,781 B1 * 4/2003 Carter ................... A61B 5/1116
600/594
(Continued)

FOREIGN PATENT DOCUMENTS

CN 101316053 A 12/2008
CN 101971453 A 2/2011
(Continued)

OTHER PUBLICATIONS

Jul. 8, 2014 Search Report issued in International Patent Application No. PCT/JP2014/064091.
(Continued)

Primary Examiner — Levi Gannon
(74) Attorney, Agent, or Firm — Oliff PLC

(57) ABSTRACT

A wireless power transmission apparatus which is charged in a short charging time and prevents the shortening of the life of a secondary battery is provided. A wireless power transmission apparatus includes a current-voltage detector configured to measure an input impedance Zin of the wireless power transmission apparatus including the power-supplied device and a control device configured to determine whether a constant current charging period (CC) is finished by utilizing a change in the input impedance Zin measured by the current-voltage detector and terminate the charging of the lithium ion secondary battery when it is determined that the constant current charging period (CC) is finished.

7 Claims, 15 Drawing Sheets

(51) Int. Cl.
  *H02J 50/12* (2016.01)
  *H02J 50/50* (2016.01)
  *H02J 7/00* (2006.01)

(58) Field of Classification Search
  CPC .. H02J 17/00; H02J 50/10; H02J 50/12; H02J 50/50
  USPC ........................................... 307/104
  See application file for complete search history.

(56) References Cited

U.S. PATENT DOCUMENTS

| | | | |
|---|---|---|---|
| 2004/0095291 A1 | 5/2004 | Shigemasa et al. | |
| 2009/0160261 A1 | 6/2009 | Elo | |
| 2010/0244580 A1 | 9/2010 | Uchida et al. | |
| 2010/0277003 A1 | 11/2010 | Von Novak et al. | |
| 2012/0104998 A1 | 5/2012 | Takada et al. | |
| 2014/0167704 A1* | 6/2014 | Lafontaine | G01R 25/00 320/137 |
| 2014/0203658 A1* | 7/2014 | Taguchi | H01M 10/46 307/104 |
| 2015/0137614 A1* | 5/2015 | Kang | H02J 17/00 307/104 |
| 2015/0328997 A1* | 11/2015 | Hashizume | H02J 5/005 307/104 |
| 2016/0126749 A1* | 5/2016 | Shichino | H02J 5/005 307/104 |
| 2016/0181860 A1 | 6/2016 | Partovi et al. | |
| 2016/0372976 A1* | 12/2016 | Shimura | H02J 7/025 |

FOREIGN PATENT DOCUMENTS

| | | |
|---|---|---|
| JP | 2010-183810 A | 8/2010 |
| JP | 2010-239769 A | 10/2010 |
| JP | 4624768 B2 | 2/2011 |
| JP | 2013-070581 A | 4/2013 |
| KR | 2004-0044116 A | 5/2004 |
| TW | 200943666 A | 10/2009 |
| TW | 201106572 A | 2/2011 |

OTHER PUBLICATIONS

Sep. 2, 2014 Office Action issued in Japanese Patent Application No. 2013-143293.
Dec. 20, 2016 Office Action issued in Korean Patent Application No. 10-2016-7001887.
May 27, 2017 Office Action issued in Chinese Patent Application No. 201480039388.4.
Jan. 24, 2017 Search Report issued in European Patent Application No. 14823702.7.
Apr. 9, 2018 Office Action issued in Chinese Patent Application No. 201480039388.4.

* cited by examiner (MEASUREMENT EXPERIMENT 2-1)

(MEASUREMENT EXPERIMENT 2-2)

(MEASUREMENT EXPERIMENT 2-3)

(MEASUREMENT EXPERIMENT 2-4)

WIRELESS POWER TRANSMISSION APPARATUS AND SUPPLY POWER CONTROL METHOD OF WIRELESS POWER TRANSMISSION APPARATUS

TECHNICAL FIELD

The present invention relates to a wireless power transmission apparatus configured to supply power by resonance phenomenon from a power-supplying module connected to a power source to a power-receiving module connected to a power-supplied device including a secondary battery chargeable by a constant current-constant voltage charging system, and a supply power control method of the wireless power transmission apparatus.

BACKGROUND

Portable electronic devices such as laptop PCs, tablet PCs, digital cameras, mobile phones, portable gaming devices, earphone-type music players, wireless headsets, hearing aids, recorders, which are portable while being used by the user are rapidly increasing in recent years. Many of these portable electronic devices have therein a rechargeable battery, which requires periodical charging. To facilitate the work for charging the rechargeable battery of an electronic device, there are an increasing number of devices for charging rechargeable batteries by using a power supplying technology (wireless power transmission technology performing power transmission by varying the magnetic field) that performs wireless power transmission between a power-supplying device and a power-receiving device mounted in an electronic device.

For Example, as a wireless power transmission technology, there have been known, for Example, a technology that performs power transmission by means of electromagnetic induction between coils (e.g. see PTL 1), a technology that performs power transmission by means of resonance phenomenon (magnetic field resonant state) between resonators (coils) provided to the power-supplying device and the power-receiving device (e.g. see PTL 2).

As a method for charging a rechargeable battery (e.g., a lithium ion secondary battery), a constant current-constant voltage charging system has been known. In the constant current-constant voltage charging system, charging is performed by a constant current for a while after the start of the charging. When the voltage applied while the charging by the constant current is being performed increases to a predetermined upper limit voltage, the charging is performed by a constant voltage while the voltage is maintained at the upper limit voltage.

CITATION LIST

Patent Literatures

[PTL 1] Japanese Patent No. 4624768
[PTL 2] Japanese Unexamined Patent Publication No. 2010-239769

SUMMARY OF INVENTION

Technical Problem

However, when a lithium ion secondary battery is charged under the constant current-constant voltage charging system by the wireless power transmission apparatus performing power transmission by wireless, a current value supplied to the rechargeable battery is attenuated as shown in FIG. 5, at the shift from the constant current charging to the constant voltage charging. As a result, a charging amount with respect to a charging time is decreased in the constant voltage charging, and hence it takes time to perform the charging to the full amount.

Furthermore, the life of a secondary battery such as a lithium ion secondary battery is typically shortened when the secondary battery is repeatedly charged to the full amount.

An object of the present invention is therefore to provide a wireless power transmission apparatus which is charged in a short charging time and prevents the shortening of the life of a secondary battery.

Solution to Problem

According to an aspect of the invention for achieving the object above, a wireless power transmission apparatus is configured to supply power by resonance phenomenon from a power-supplying module connected with a power source to a power-receiving module connected with a power-supplied device including a secondary battery which is chargeable by a constant current-constant voltage charging system, the wireless power transmission apparatus including: an input impedance measuring apparatus configured to measure an input impedance of the wireless power transmission apparatus including the power-supplied device; and a control device configured to determine whether a constant current charging period is finished based on a change in the input impedance measured by the input impedance measuring apparatus, and terminate charging when it is determined that the constant current charging period is finished.

According to the arrangement above, when a secondary battery chargeable with the shift from the constant current charging to the constant voltage charging is charged by utilizing resonance phenomenon, it is determined that the constant current charging period is finished when there is a change in the input impedance measured by the input impedance measuring apparatus, and the charging is terminated when the constant current charging period is finished.

The life of the secondary battery is typically elongated when, instead of repeating the charging to the full amount, charging which is terminated a while before reaching the full amount is repeated. Because the charging of the secondary battery is terminated at the end of the constant current charging period as above, the charging terminated a while before reaching the full amount becomes possible, and hence the life of the secondary battery is elongated. Typically, the secondary battery chargeable by constant current-constant voltage charging is charged to about 80% of the full amount in only the constant current charging period, and hence the charging amount is sufficient.

Furthermore, because the charging is terminated at the end of the constant current charging period without performing the constant voltage charging, the charging time is shortened.

According to another aspect of the invention for achieving the object above, in the wireless power transmission apparatus, the control device determines that the constant current charging period is finished, when the input impedance measured by the input impedance measuring apparatus becomes higher than or lower than a predetermined threshold.

According to this arrangement, it is determined that the constant current charging period is finished when the input impedance measured by the input impedance measuring apparatus becomes higher than or lower than the predetermined threshold.

According to another aspect of the invention for achieving the object above, in the wireless power transmission apparatus, the control device determines that the constant current charging period is finished when a load variation characteristic becomes higher than or lower than a predetermined threshold, the load variation characteristic being an amount of change with respect to a charging time in the input impedance measured by the input impedance measuring apparatus.

According to the arrangement above, it is determined that the constant current charging period is finished when a load variation characteristic becomes higher than or lower than the predetermined threshold, the load variation characteristic being an amount of change with respect to a charging time in the input impedance measured by the input impedance measuring apparatus.

According to another aspect of the invention for achieving the object above, in the wireless power transmission apparatus, the power-supplying module and the power-receiving module include at least a power-supplying coil, a power-supplying resonator, a power-receiving resonator, and a power-receiving coil, and the load variation characteristic is adjustable by adjusting at least one of a coupling coefficient, between the power-supplying coil and the power-supplying resonator, a coupling coefficient between the power-supplying resonator and the power-receiving resonator, and a coupling coefficient between the power-receiving resonator and the power-receiving coil.

According to the arrangement above, the load variation characteristic is adjustable by adjusting at least one of a coupling coefficient, between the power-supplying coil and the power-supplying resonator, a coupling coefficient between the power-supplying resonator and the power-receiving resonator, and a coupling coefficient between the power-receiving resonator and the power-receiving coil.

With this arrangement, for example, the measurement accuracy of the input impedance measuring apparatus is improved when the load variation characteristic is increased, because a change in the load variation characteristic within a short time becomes large.

According to another aspect of the invention for achieving the object above, in the wireless power transmission apparatus, the load variation characteristic is increased by increasing the coupling coefficient between the power-supplying coil and the power-supplying resonator.

According to this arrangement, the load variation characteristic is increased by increasing the coupling coefficient between the power-supplying coil and the power-supplying resonator. With this arrangement, the measurement accuracy of the input impedance measuring apparatus is improved because a change in the load variation characteristic within a short time becomes large.

According to another aspect of the invention for achieving the object above, in the wireless power transmission apparatus, the load variation characteristic is increased by increasing the coupling coefficient between the power-receiving resonator and the power-receiving coil.

According to this arrangement, the load variation characteristic is increased by increasing the coupling coefficient between the power-receiving resonator and the power-receiving coil. With this arrangement, the measurement accuracy of the input impedance measuring apparatus is improved because a change in the load variation characteristic within a short time becomes large.

According to another aspect of the invention for achieving the object above, in the wireless power transmission apparatus, the load variation characteristic is increased by increasing the coupling coefficient between the power-supplying coil and the power-supplying resonator and the coupling coefficient between the power-receiving resonator and the power-receiving coil.

With this arrangement, the coupling coefficient between the power-supplying coil and the power-supplying resonator and the coupling coefficient between the power-receiving resonator and the power-receiving coil are increased. With this arrangement, the measurement accuracy of the input impedance measuring apparatus is improved because a change in the load variation characteristic within a short time becomes large.

Another aspect of the invention for achieving the object above is a supply power control method of a wireless power transmission apparatus for supplying, by changing a magnetic field, power from a power-supplying module connected with a power source to a power-receiving module connected with a power-supplied device including a secondary battery which is chargeable by a constant current-constant voltage charging system, the wireless power transmission apparatus including: an input impedance measuring apparatus configured to measure an input impedance of the power transmission apparatus; and a control device, and the control device being configured to execute the steps of: determining whether a constant current charging period is finished, by utilizing a change in the input impedance measured by the input impedance measuring apparatus; and terminating charging when it is determined that the constant current charging period is finished.

According to the method above, when a secondary battery chargeable with the shift from the constant current charging to the constant voltage charging is charged by utilizing resonance phenomenon, it is determined that the constant current charging period is finished when there is a change in the input impedance measured by the input impedance measuring apparatus, and the charging is terminated when the constant current charging period is finished.

The life of the secondary battery is typically elongated when, instead of repeating the charging to the full amount, charging which is terminated a while before reaching the full amount is repeated. Because the charging of the secondary battery is terminated at the end of the constant current charging period as above, the charging terminated a while before reaching the full amount becomes possible, and hence the life of the secondary battery is elongated. Typically, the secondary battery chargeable by constant current-constant voltage charging is charged to about 80% of the full amount in only the constant current charging period, and hence the charging amount is sufficient.

Furthermore, because the charging is terminated at the end of the constant current charging period without performing the constant voltage charging, the charging time is shortened.

Advantageous Effects

A wireless power transmission apparatus which is charged in a short charging time and prevents the shortening of the life of a secondary battery is provided.

DESCRIPTION OF EMBODIMENTS

The following will describe a wireless power transmission apparatus and a supply power control method of the wireless power transmission apparatus of an embodiment of the present invention.

Embodiment

Figure 1:
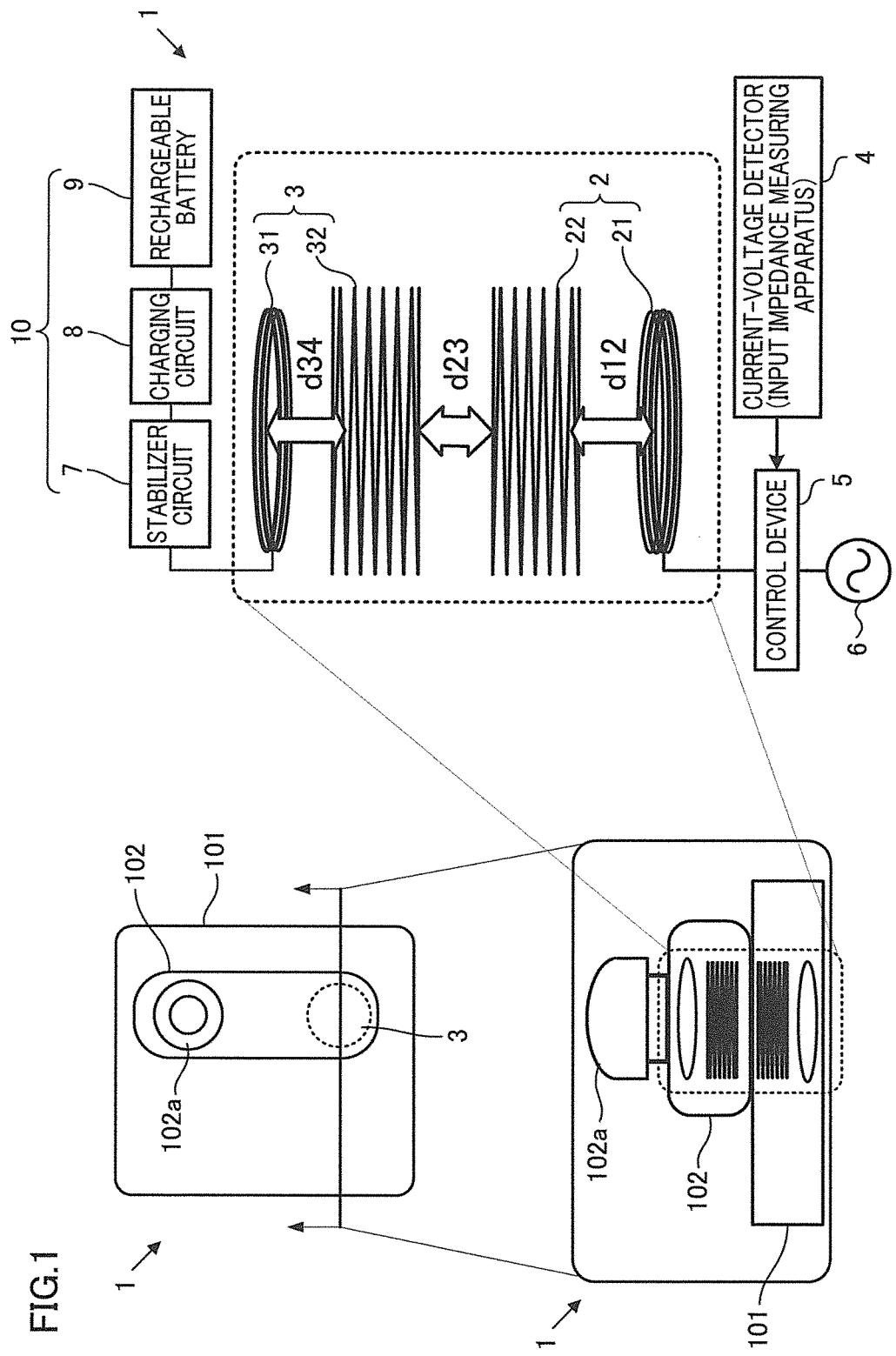
FIG. 1 illustrates a charger on which a power-supplying module is mounted and a wireless headset on which a power-receiving module is mounted.

To begin with, as shown in FIG. 1, the present embodiment will describe, as an example of a wireless power transmission apparatus 1, a charger 101 including a power-supplying module 2 and a wireless headset 102 including a power-receiving module 3.
(Structure of Wireless Power Transmission Apparatus 1)

Figure 2:
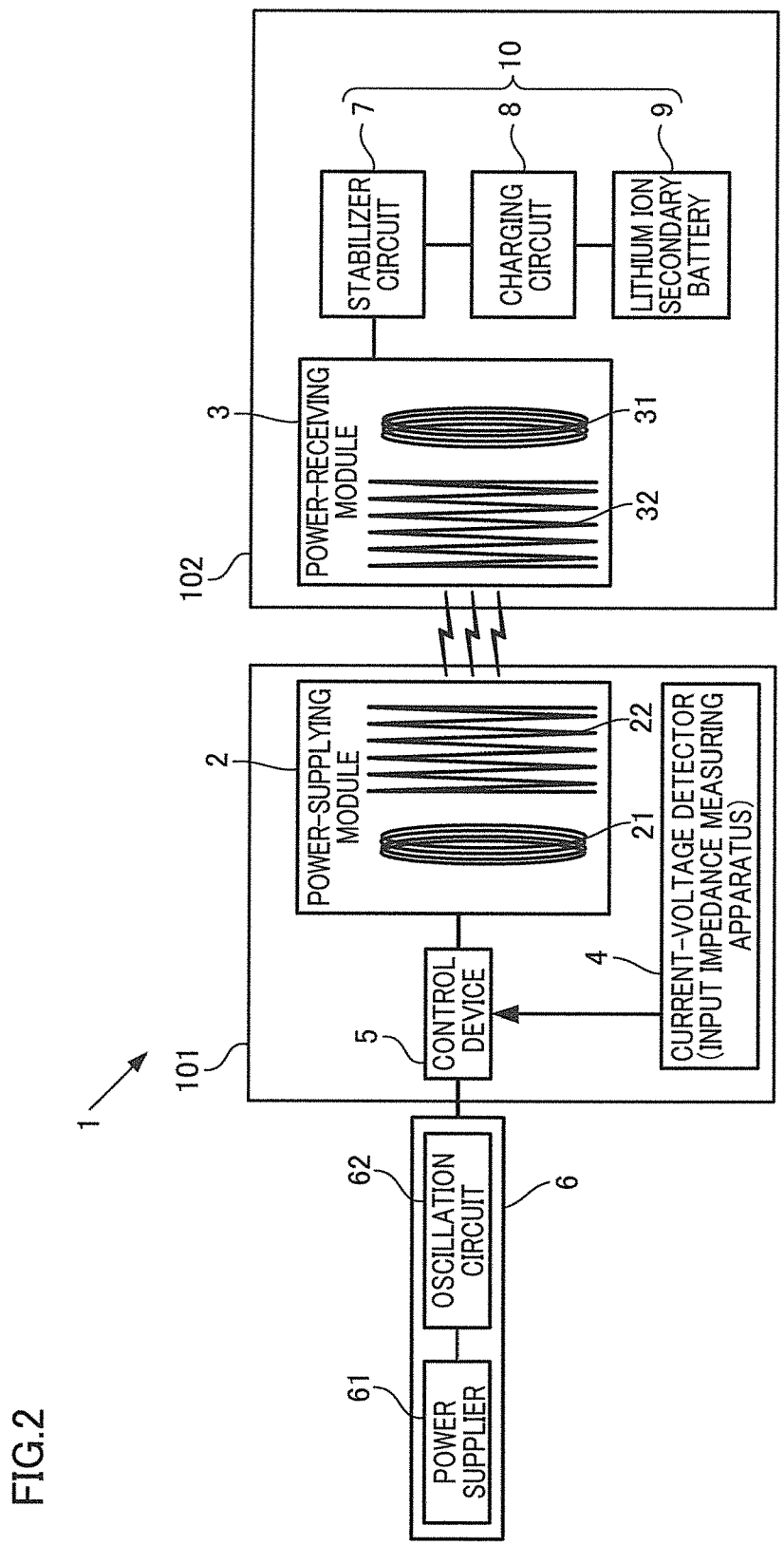
FIG. 2 is a block diagram of a wireless power transmission apparatus.

As shown in FIG. 1, the wireless power transmission apparatus 1 is formed of a charger 101 and a wireless headset 102. As shown in FIG. 2, the charger 101 includes a power-supplying module 2 including a power-supplying coil 21 and a power-supplying resonator 22, a current-voltage detector 4 (equivalent to an input impedance measuring apparatus), and a control device 5. In the meanwhile, the wireless headset 102 includes an earphone speaker portion 102a, a power-receiving module 3 including a power-receiving coil 31 and a power-receiving resonator 32, a stabilizer circuit 7 configured to rectify received AC power, a charging circuit 8 configured to prevent overcharge, and a lithium ion secondary battery. (It is noted that devices providing functions as an audio apparatus are omitted). The power-supplying coil 21 of the power-supplying module 2 is, via the control device 5, connected with an AC power source 6 (a power supplier 61 and an oscillation circuit 62 on the outside) configured to supply power to the power-supplying module 2, whereas the power-receiving coil 31 of the power-receiving module 3 is, via the stabilizer circuit 7 and the charging circuit 8, connected with the lithium ion secondary battery 9. In the figures, for the sake of convenience, the stabilizer circuit 7, the charging circuit 8, and the lithium ion secondary battery are illustrated outside the power-receiving module 3. However, these members are provided on the coil inner circumference side of the power-receiving coil 31 and the power-receiving resonator 32 which are solenoids. It should be noted that, as shown in FIG. 1 and FIG. 2, the stabilizer circuit 7, the charging circuit 8, and the lithium ion secondary battery 9 of the present embodiment are power-supplied devices 10 each of which is the final destination of the supplied power. The power-supplied device 10 is a generic term for the entire device to which the supplied power is destined, which is connected to the power-receiving module 3.

Although not illustrated, the charger 101 is provided with a housing groove which is provided for housing the wireless headset 102 and is shaped in accordance with the shape of the wireless headset 102. As the wireless headset 102 is housed in this housing groove of the charger 101, the wireless headset 102 is positioned so that the power-supplying module 2 of the charger 101 and the power-receiving module 3 of the wireless headset 102 oppose each other.

Figure 4:
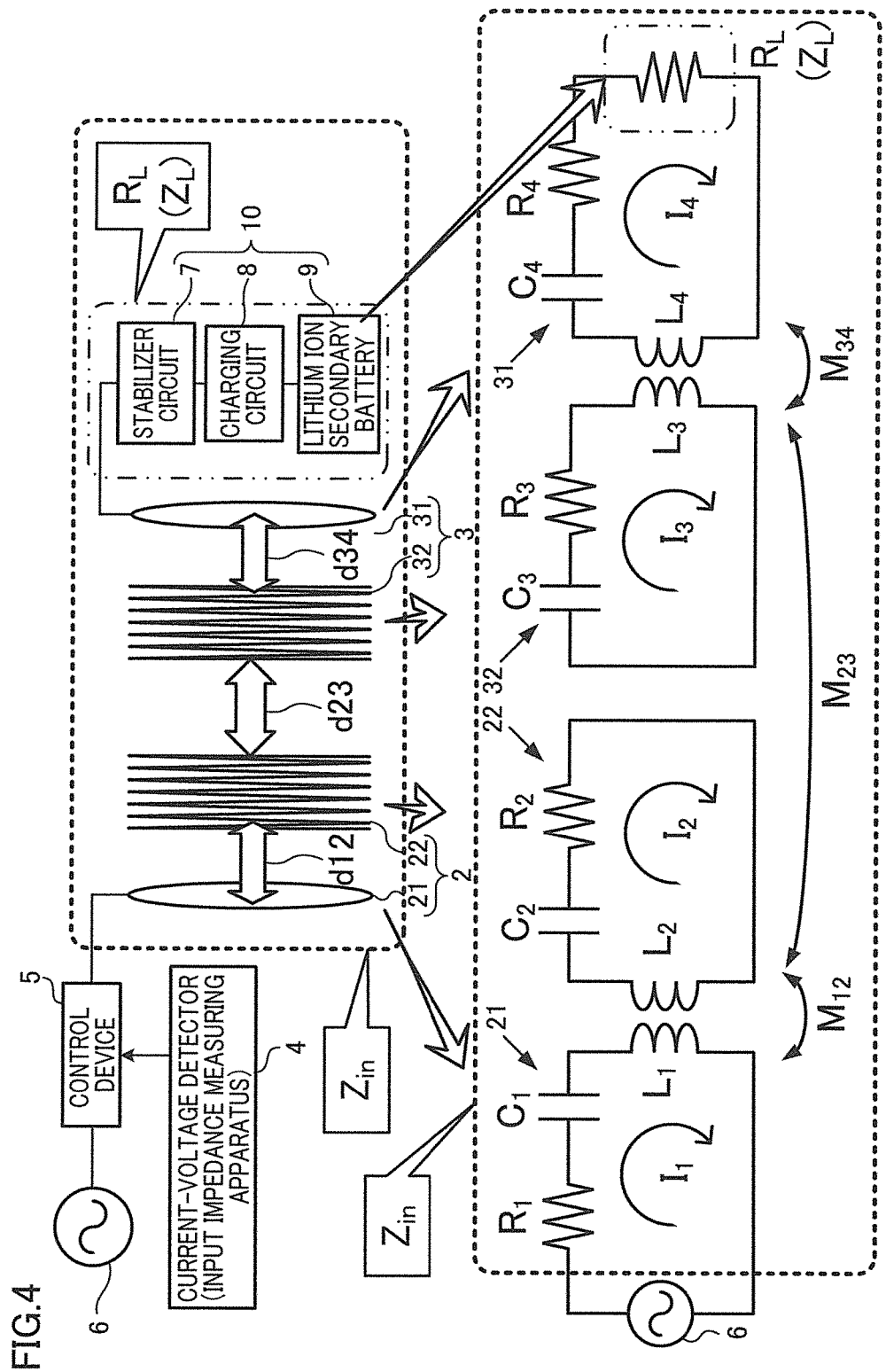
FIG. 4 illustrates the wireless power transmission apparatus in the form of an equivalent circuit.

The power-supplying coil 21 plays a role of supplying power obtained from the AC power source 6 to the power-supplying resonator 22 by means of electromagnetic induction. As shown in FIG. 4, the power-supplying coil 21 is constituted by an RLC circuit whose elements include a resistor $R_1$, a coil $L_1$, and a capacitor $C_1$. The coil $L_1$ part is made of a copper wire material (coated by an insulation film) and is 15 mmφ in coil diameter. The total impedance of a circuit element constituting the power-supplying coil 21 is $Z_1$. In the present embodiment, $Z_1$ is the total impedance of the RLC circuit (circuit element) constituting the power-supplying coil 21, which includes the resistor $R_1$, the coil $L_1$, and the capacitor $C_1$. Further, the current that flows in the power-supplying coil 21 is $I_1$.

The power-receiving coil 31 plays roles of receiving the power having been transmitted as a magnetic field energy from the power-supplying resonator 22 to the power-receiving resonator 32, by means of electromagnetic induction, and supplying the power to the lithium ion secondary battery 9 via the stabilizer circuit 7 and the charging circuit 8. As shown in FIG. 4, the power-receiving coil 31, similarly to the power-supplying coil 21, is constituted by an RLC circuit whose elements include a resistor $R_4$, a coil $L_4$, and a capacitor $C_4$. The coil $L_4$ part is made of a copper wire material (coated by an insulation film) and is 11 mmφ in coil diameter. The total impedance of a circuit element constituting the power-receiving coil 31 is $Z_4$. In the present embodiment, $Z_4$ is the total impedance of the RLC circuit (circuit element) constituting the power-receiving coil 31, which includes the resistor $R_4$, the coil $L_4$, and the capacitor $C_4$. The total impedance of the power-supplied device 10 connected with the power-receiving coil 31 is $Z_L$. Further, the current that flows in the power-receiving coil 31 is $I_4$. While the total impedance of the power-supplied device 10 is $Z_L$, this may be replaced with $R_L$ for the sake of convenience.

As shown in FIG. 4, the power-supplying resonator 22 is constituted by an RLC circuit whose elements include a resistor $R_2$, a coil $L_2$, and a capacitor $C_2$. Further, as shown in FIG. 4, the power-receiving resonator 32 is constituted by an RLC circuit whose elements include a resistor $R_3$, a coil $L_3$, and a capacitor $C_3$. The power-supplying resonator 22 and the power-receiving resonator 32 each serves as a resonance circuit and plays a role of creating a magnetic field resonant state. The magnetic field resonant state (resonance phenomenon) here is a phenomenon in which two or more coils resonate with each other in a resonance frequency band. The total impedance of a circuit element constituting the power-supplying resonator 22 is $Z_2$. In the present embodiment, $Z_2$ is the total impedance of the RLC circuit (circuit element) constituting the power-supplying resonator 22, which includes the resistor $R_2$, the coil $L_2$, and the capacitor $C_2$. The total impedance of a circuit element constituting the power-receiving resonator 32 is $Z_3$. In the present embodiment, $Z_3$ is the total impedance of the RLC circuit (circuit element) constituting the power-receiving resonator 32, which includes the resistor $R_3$, the coil $L_3$, and the capacitor $C_3$. Further, the current that flows in the power-supplying resonator 22 is $I_2$, and the current that flows in the power-receiving resonator 32 is $I_3$.

In the RLC circuit which is the resonance circuit in each of the power-supplying resonator 22 and the power-receiving resonator 32, the resonance frequency is f which is derived from (Formula 1) below, where the inductance is L and the capacity of capacitor is C. In the present embodiment, the resonance frequency of the power-supplying coil 21, the power-supplying resonator 22, the power-receiving resonator 32, and the power-receiving coil 31 is set to 970 kMHz.

$$f = \frac{1}{2\pi\sqrt{LC}} \quad \text{(Formula 1)}$$

The power-supplying resonator 22 is a solenoid coil made of a copper wire material (coated by an insulation film) and is 15 mmϕ in coil diameter. The power-receiving resonator 32 is a solenoid coil made of a copper wire material (coated by an insulation film) and is 11 mmϕ in coil diameter. The resonance frequency of the power-supplying resonator 22 and that of the power-receiving resonator 32 are matched with each other. Each of the power-supplying resonator 22 and the power-receiving resonator 32 may be a spiral coil or a solenoid coil as long as it is a resonator using a coil.

In regard to the above, the distance between the power-supplying coil 21 and the power-supplying resonator 22 is denoted as d12, the distance between the power-supplying resonator 22 and the power-receiving resonator 32 is denoted as d23, and the distance between the power-receiving resonator 32 and the power-receiving coil 31 is denoted as d34 (see FIG. 1).

Further, as shown in FIG. 4, a mutual inductance between the coil $L_1$ of the power-supplying coil 21 and the coil $L_2$ of the power-supplying resonator 22 is $M_{12}$, a mutual inductance between the coil $L_2$ of the power-supplying resonator 22 and the coil $L_3$ of the power-receiving resonator 32 is $M_{23}$, and a mutual inductance between the coil $L_3$ of the power-receiving resonator 32 and the coil $L_4$ of the power-receiving coil 31 is $M_{34}$. In the wireless power transmission apparatus 1, the coupling coefficient between the coil $L_1$ and the coil $L_2$ is represented as $k_{12}$, the coupling coefficient between the coil $L_2$ and the coil $L_3$ is represented as $k_{23}$, and the coupling coefficient between the coil $L_3$ and the coil $L_4$ is $k_{34}$.

Figure 3:
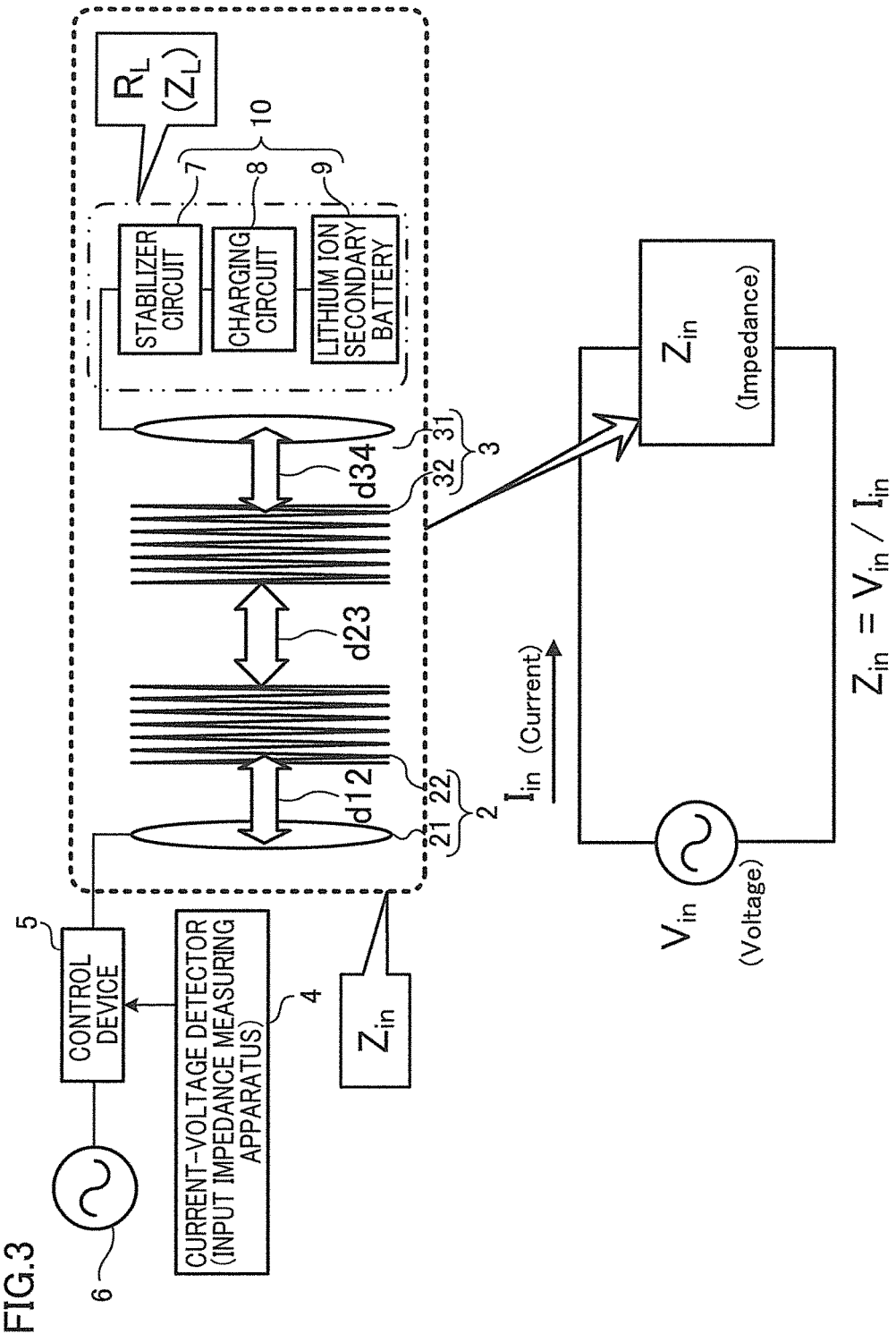
FIG. 3 is a schematic explanatory diagram of the wireless power transmission apparatus.

The wireless power transmission apparatus 1 (including the stabilizer circuit 7, the charging circuit 8, and the lithium ion secondary battery 9) is represented by a circuit diagram shown in the lower drawing in FIG. 3. In this circuit diagram, the entirety of the wireless power transmission apparatus 1 (including the stabilizer circuit 7, the charging circuit 8, and the lithium ion secondary battery 9) is replaced with one input impedance $Z_{in}$, and a voltage applied to the wireless power transmission apparatus 1 is represented as a voltage $V_{in}$ and a current input to the wireless power transmission apparatus 1 is represented as $I_{in}$.

To represent the input impedance $Z_{in}$ of the wireless power transmission apparatus 1 in a more detailed manner, the structure of the wireless power transmission apparatus 1 is represented by an equivalent circuit as shown in FIG. 4. Based on the equivalent circuit shown in FIG. 4, the input impedance $Z_{in}$ of the wireless power transmission apparatus 1 can be represented as shown in (Formula 2).

$$Z_{in} = Z_1 + \cfrac{(\omega M_{12})^2}{Z_2 + \cfrac{(\omega M_{23})^2}{Z_3 + \cfrac{(\omega M_{34})^2}{Z_4 + Z_L}}} \quad \text{(Formula 2)}$$

$$M_{12} = k_{12}\sqrt{L_1 L_2} \quad M_{23} = k_{23}\sqrt{L_2 L_3} \quad M_{34} = k_{34}\sqrt{L_3 L_4}$$

($k_{ij}$ indicates coupling coefficient between $L_i$ and $L_j$)

The impedances $Z_1$, $Z_2$, $Z_3$, $Z_4$, and $Z_L$ of the power-supplying coil 21, the power-supplying resonator 22, the power-receiving resonator 32, and the power-receiving coil 31 of the wireless power transmission apparatus 1 of the present embodiment are represented as shown in (Formula 3).

$$Z_1 = R_1 + j\left(\omega L_1 - \frac{1}{\omega C_1}\right) \quad \text{(Formula 3)}$$

$$Z_2 = R_2 + j\left(\omega L_2 - \frac{1}{\omega C_2}\right)$$

$$Z_3 = R_3 + j\left(\omega L_3 - \frac{1}{\omega C_3}\right)$$

$$Z_4 = R_4 + j\left(\omega L_4 - \frac{1}{\omega C_4}\right)$$

$$Z_L = R_L$$

When the (Formula 3) is introduced into (Formula 2), (Formula 4) is established.

(Formula 4)

$$Z_{in} = R_1 + j\left(\omega L_1 - \frac{1}{\omega C_1}\right) + \cfrac{(\omega M_{12})^2}{R_2 + j\left(\omega L_2 - \frac{1}{\omega C_2}\right) + \cfrac{(\omega M_{23})^2}{R_3 + j\left(\omega L_3 - \frac{1}{\omega C_3}\right) + \cfrac{(\omega M_{34})^2}{R_4 + j\left(\omega L_4 - \frac{1}{\omega C_4}\right) + R_4}}}$$

The resistance values, inductances, and capacities of capacitors, of $R_1$, $L_1$, and $C_1$ of the RLC circuit of the power-supplying coil 21, $R_2$, $L_2$, and $C_2$ of the RLC circuit of the power-supplying resonator 22, $R_3$, $L_3$, and $C_3$ of the RLC circuit of the power-receiving resonator 32, and $R_4$, $L_4$, and $C_4$ of the RLC circuit of the power-receiving coil 31 and the coupling coefficients $k_{12}$, $k_{23}$, and $k_{34}$ are preferably set to satisfy the relational expression (Formula 4) as parameters variable at the stage of designing and manufacturing.

The current-voltage detector 4 provided in the charger 101 includes a current detector and a voltage detector. These detectors are configured to detect the voltage $V_{in}$ applied to the wireless power transmission apparatus 1 and the current $I_{in}$ input to the wireless power transmission apparatus 1, respectively.

As detailed later, the control device 5 has functions of calculating an input impedance $Z_{in}$ based on the voltage $V_{in}$ and the current $I_{in}$ detected by the current-voltage detector 4 (see Formula 5), and determining whether to supply power from the AC power source 6 to the power-supplying module 2 in accordance with a change in the calculated input impedance $Z_{in}$, and further has a function of blocking the power supply from the AC power source 6 to the power-supplying module 2 when it is determined that no power is supplied. The control device 5 is, for example, formed of a microcomputer, a storage device, or the like. The current-voltage detector 4 configured to detect the voltage $V_{in}$ and the current $I_{in}$ is equivalent to an input impedance measuring apparatus.

$$Z_{in} = \frac{V_{in}}{I_{in}} \quad \text{(Formula 5)}$$

(Charging Characteristic in Charging of Lithium Ion Secondary Battery 9)

Now, the following will describe a solution based on the charging characteristic in the charging of the lithium ion secondary battery 9 which is a target of power supply when the wireless power transmission apparatus 1 of the present embodiment is used.

In the present embodiment, the lithium ion secondary battery 9 is used as a power-supplied device 10 to which power is supplied. The lithium ion secondary battery 9 is typically charged based on a constant current-constant voltage charging system. In the charging of the lithium ion secondary battery 9 based on this constant current-constant voltage charging system, as shown in the graph of the charging characteristic of the lithium ion secondary battery 9 in FIG. 5, the lithium ion secondary battery 9 is charged by a constant current ($I_{ch}$) for a while after the start of the charging (CC: constant current). While the charging by the constant current is being performed, the voltage ($V_{ch}$) applied to the lithium ion secondary battery 9 is increased to a predetermined upper limit voltage (4.2V in the present embodiment). When the voltage ($V_{ch}$) is increased to the upper limit voltage, shift to the charging by a constant voltage occurs while the voltage is maintained at the upper limit voltage (CV: constant voltage). As the charging by the constant voltage (CV) is performed, the current value ($I_{ch}$) input to the lithium ion secondary battery 9 is attenuated, and the charging to the full amount is achieved when the current value reaches a predetermined current value or when a predetermined time elapses.

Figure 5:
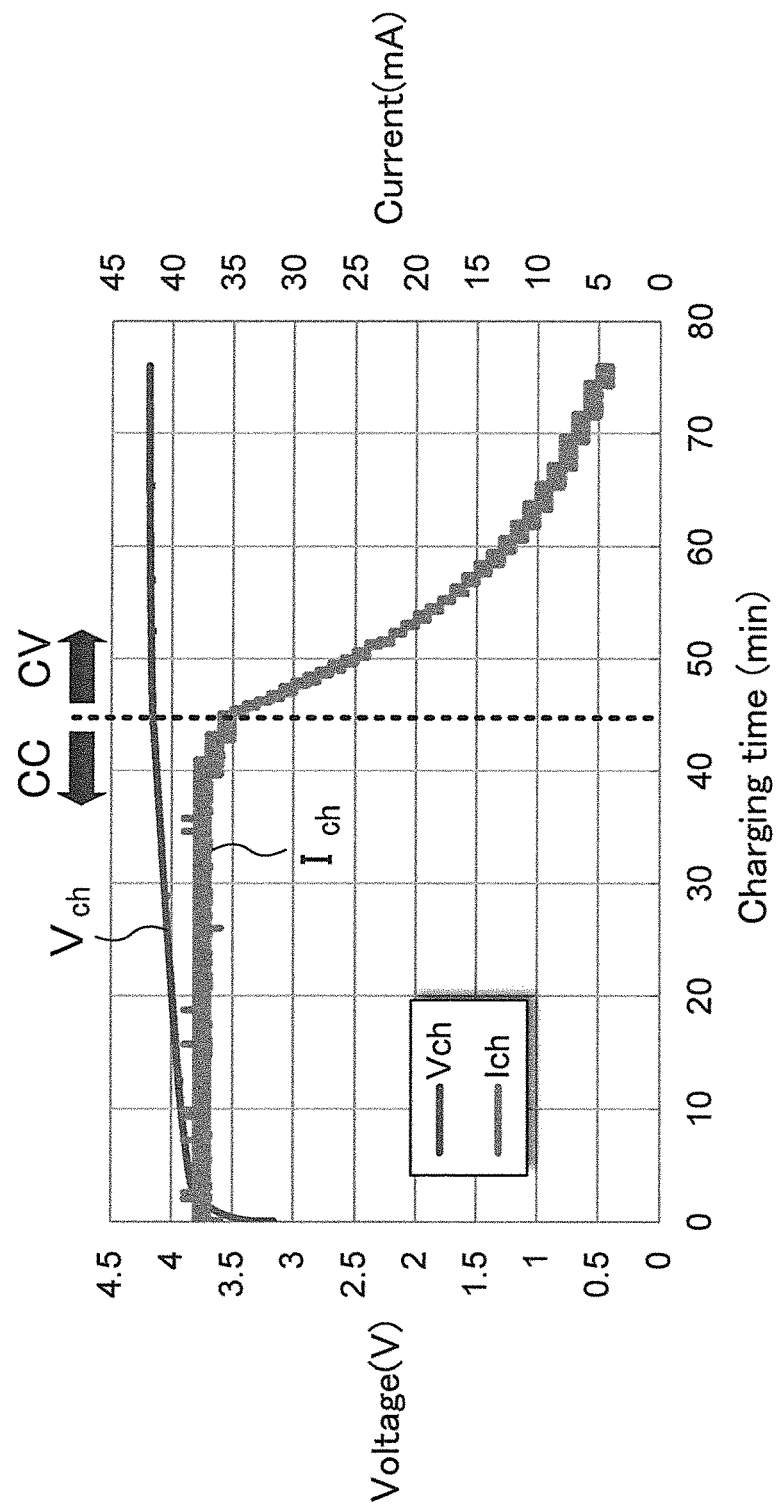
FIG. 5 is a graph showing the charging characteristic of a lithium ion secondary battery.

However, at the shift from the constant current charging (CC) to the constant voltage charging (CV), as shown FIG. 5, the current value ($I_{ch}$) supplied to the lithium ion secondary battery 9 is attenuated. As a result, the charging amount with respect to the charging time is decreased in the constant voltage charging (CV), and hence it takes time to perform the charging to the full amount.

In consideration of this charging characteristic, it is understood that the charging time is shortened if the charging of the lithium ion secondary battery 9 is terminated when the constant current charging (CC) is finished. In the lithium ion secondary battery 9 chargeable based on the constant current-constant voltage charging, because the charging to about 80% of the full amount is possible in the constant current charging period (CC) only, a sufficient charging amount is achieved even if the charging of the lithium ion secondary battery 9 is terminated when the constant current charging (CC) is finished. In addition to the above, because it has been known that the life of the lithium ion secondary battery 9 is typically shortened when the charging to the full amount is repeated, the life of the lithium ion secondary battery 9 is elongated when the charging of the lithium ion secondary battery 9 is terminated when the constant current charging (CC) is finished, instead of the charging to the full amount.

The object above is achieved in such a way that, whether the shift from the constant current charging (CC) to the constant voltage charging (CV) is performed is determined, and when the shift from the constant current charging (CC) to the constant voltage charging (CV) is detected, the charging of the lithium ion secondary battery 9 is terminated because the constant current charging (CC) is finished.

To be more specific, at the shift from the constant current charging (CC) to the constant voltage charging (CV), because the current value ($I_{ch}$) input to the lithium ion secondary battery 9 is attenuated, the load impedance of the power-supplied device 10 including the lithium ion secondary battery 9 is increased.

Figure 8:
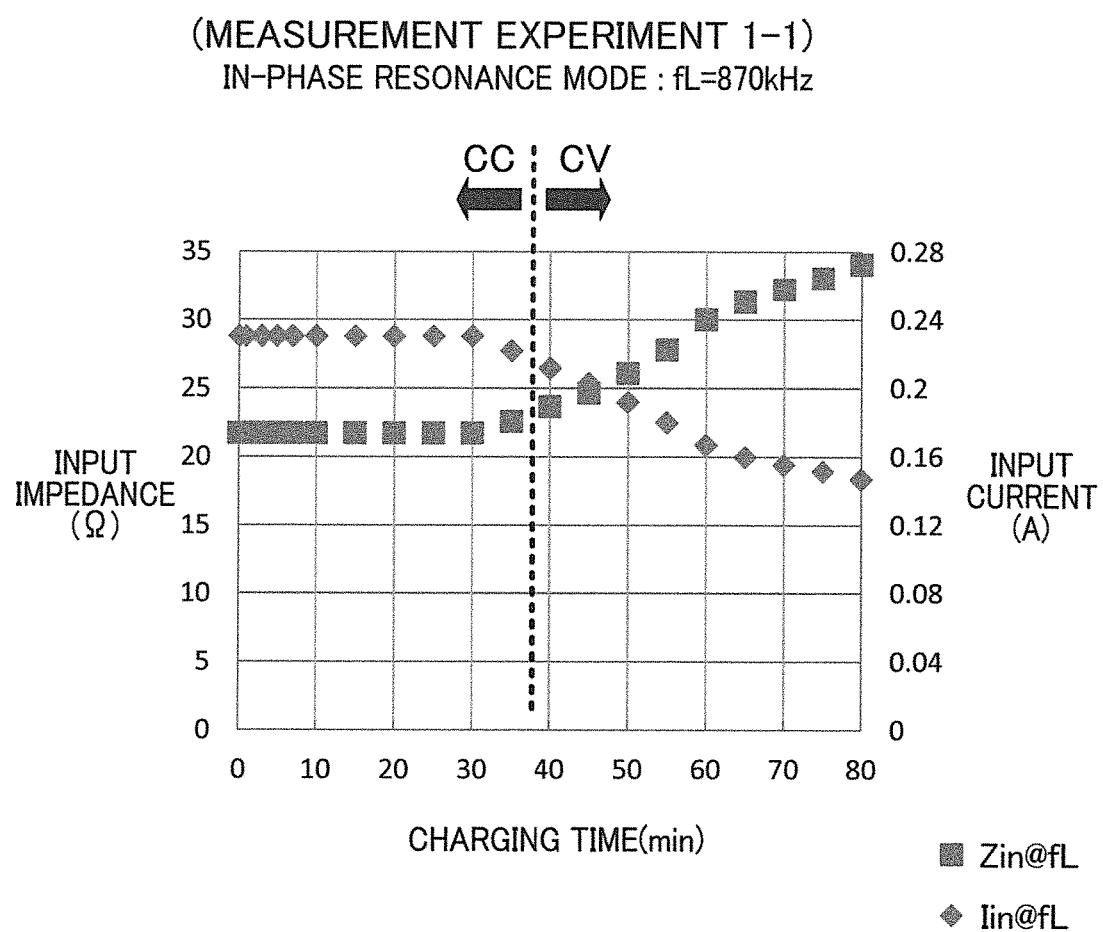
FIG. 8 is a graph showing a measurement result of Measurement Experiment 1-1.

On this account, the input impedance $Z_{in}$ of the entire wireless power transmission apparatus 1 including the power-supplied device 10 is varied (see FIG. 8).

In consideration of the above, in the charging operation for the wireless power transmission apparatus 1 of the present embodiment, a change in the input impedance $Z_{in}$ of the entire wireless power transmission apparatus 1 including the power-supplied device 10 is measured at the shift from the constant current charging (CC) to the constant voltage charging (CV), and the charging of the lithium ion secondary battery 9 is because the constant current charging (CC) is finished, when a change in the input impedance $Z_{in}$ is observed.

(Change in Input Impedance $Z_{in}$)

In the present embodiment, whether the constant current charging (CC) period is finished is determined based on measurement of a change in the input impedance $Z_{in}$. In regard to such a change in the input impedance $Z_{in}$, it is determined that the constant current charging period is finished, when the input impedance $Z_{in}$ becomes greater than or smaller than a predetermined threshold, or it is determined that the constant current charging period is finished, when a load variation characteristic which indicates an amount of change in the input impedance $Z_{in}$ with respect to a charging time becomes greater than or smaller than a predetermined threshold. Either way, it is necessary to set a predetermined threshold with prior knowledge in how the input impedance $Z_{in}$ is changed at the shift from the constant current charging (CC) to the constant voltage charging (CV). The following will therefore describe setting of a change in the input impedance $Z_{in}$ with reference to Measurement Experiments.

The load variation characteristic is an amount of change in the input impedance $Z_{in}$ of the wireless power transmission apparatus 1 with respect to a charging time at the shift from the constant current charging to the constant voltage charging. This load variation characteristic is a predetermined amount of change ($\Delta Y$) in the Y axis relative to a predetermined amount of change (ΔX) in the X axis, where the X axis indicates a charging time whereas the Y axis indicates the input impedance $Z_{in}$ (see the input impedance $Z_{in}$ in FIG. 8), and the load variation characteristic indicates an inclination. On this account, when the load variation characteristic increases, an amount of change in the input impedance $Z_{in}$ of the wireless power transmission apparatus 1 with respect to the charging time increases, and the inclination becomes steep.

(Setting of Variation Tendency of Input Impedance $Z_{in}$ at Shifting to Constant Voltage Charging)

In the present embodiment, when the lithium ion secondary battery 9 is charged by the wireless power transmission apparatus 1 based on the constant current-constant voltage charging, to increase the input impedance $Z_{in}$ at the shift to the constant voltage charging (CV), variable parameters of the power-supplying module 2 and the power-receiving module 3 such as resistance values, inductances, and capacities of capacitors $R_1$, $L_1$, and $C_1$ of the RLC circuit of the power-supplying coil 21, $R_2$, $L_2$, and $C_2$ of the RLC circuit of the power-supplying resonator 22, $R_3$, $L_3$, and $C_3$ of the RLC circuit of the power-receiving resonator 32, and $R_4$, $L_4$, and $C_4$ of the RLC circuit of the power-receiving coil 31, and coupling coefficients $k_{12}$, $k_{23}$, and $k_{34}$ are set to cause the transmission characteristic S21 of the wireless power transmission apparatus 1 relative to a later-described power-source frequency of the power supplied to the wireless power transmission apparatus 1 to have a double-hump characteristic. As the power-source frequency of the power supplied to the wireless power transmission apparatus 1 is adjusted after the transmission characteristic S21 of the wireless power transmission apparatus 1 with respect to the power-source frequency of the power supplied to the wireless power transmission apparatus 1 is arranged to have the double-hump characteristic, a variation tendency of the input impedance value of the wireless power transmission apparatus 1 in the constant voltage charging is set.

(Measurement Experiments 1-1 to 1-3)

When the transmission characteristic S21 of the wireless power transmission apparatus 1 relative to the power-source frequency of the power supplied to the wireless power transmission apparatus 1 is arranged to have the double-hump characteristic, what variation tendency is shown by the input impedance value of the wireless power transmission apparatus 1 at the shift to the constant voltage charging, when the power-source frequency of the power supplied to the wireless power transmission apparatus 1 is adjusted, will be explained with reference to Measurement Experiments 1-1 to 1-3.

In the wireless power transmission apparatus 1 used in Measurement Experiments 1-1 to 1-3, the power-supplying coil 21 is constituted by an RLC circuit including a resistor $R_1$, a coil $L_1$, and a capacitor $C_1$, and the coil $L_1$ part is set at 15 mmϕ in coil diameter. Similarly, the power-receiving coil 31 is constituted by an RLC circuit including a resistor $R_4$, a coil $L_4$, and a capacitor $C_4$. The coil $L_4$ is 11 mmϕ in coil diameter. The power-supplying resonator 22 is constituted by an RLC circuit including a resistor $R_2$, a coil $L_2$, and a capacitor $C_2$, and the coil $L_2$ part is a solenoid coil with the coil diameter of 15 mmϕ. Furthermore, the power-receiving resonator 32 is constituted by an RLC circuit including a resistor $R_3$, a coil $L_3$, and a capacitor $C_3$, and the coil $L_3$ is a solenoid coil with the coil diameter of 11 mmϕ. The values of $R_1$, $R_2$, $R_3$, and $R_4$ in the wireless power transmission apparatus 1 used in the Measurement Experiment 1-1 to 1-3 were set at 0.65Ω, 0.65Ω, 2.47Ω, and 2.0Ω, respectively. Furthermore, the values of $L_1$, $L_2$, $L_3$, and $L_4$ were set at 3.1 µH, 3.1 µH, 18.4 µH, and 12.5 µH, respectively. The coupling coefficients $k_{12}$, $k_{23}$, and $k_{34}$ were set at 0.46, 0.20, and 0.52, respectively. The resonance frequency of the power-supplying resonator 22 and the power-receiving resonator 32 was 970 kHz.

In Measurement Experiments 1-1 to 1-3, after the wireless power transmission apparatus 1 was set to have the double-hump characteristic by the arrangements above, the current $I_{in}$ and the input impedance $Z_{in}$ when the charging (power supply) of the lithium ion secondary battery 9 was performed were measured while the power-source frequency of the AC power supplied to the power-supplying module 2 was changed to three states (see FIG. 6), i.e., an in-phase resonance mode (fL), an antiphase resonance mode (fH), and a resonance frequency (f0) described below. In Measurement Experiment 1-1 to 1-3, the current $I_{in}$ and the input impedance $Z_{in}$ with respect to a charging time (Charging Time (min)) when an input voltage $V_{in}$ from the AC power source 6 to the wireless power transmission apparatus 1 was 5V were measured.

(Double-Hump Characteristic)

In Measurement Experiments, the transmission characteristic S21 of the wireless power transmission apparatus 1 with respect to the power-source frequency of the power supplied to the wireless power transmission apparatus 1 has the double-hump characteristic. The transmission characteristic "S21" is signals measured by a network analyzer (e.g., E5061B made by Agilent Technologies, Inc.) connected to the wireless power transmission apparatus 1, and is indicated in decibel. The greater the value, it means the power transmission efficiency is high. The transmission characteristic "S21" of the wireless power transmission apparatus 1 relative to the power-source frequency of the power supplied to the wireless power transmission apparatus 1 may have either single-hump or double-hump characteristic, depending on the strength of coupling (magnetic coupling) by the magnetic field between the power-supplying module 2 and the power-receiving module 3. The single-hump characteristic means the transmission characteristic "S21" relative to the power-source frequency has a single peak which occurs in the resonance frequency band (f0) (See dotted line 51 FIG. 6). The double-hump characteristic on the other hand means the transmission characteristic S21 relative to the driving frequency has two peaks, one of the peaks occurring in a power-source frequency band lower than the resonance frequency (fL), and the other occurring in a power-source frequency band higher than the resonance frequency (fH) (See full line 52 in FIG. 6). The double-hump characteristic, to be more specific, means that the reflection characteristic "S11" measured with the network analyzer connected to the wireless power transmission apparatus 1 has two peaks. Therefore, even if the transmission characteristic S21 relative to the power-source frequency appears to have a single peak, the transmission characteristic "S21" has a double-hump characteristic if the reflection characteristic S11 measured has two peaks. The power transmission efficiency indicates a ratio of the power supplied to the power-supplying module 2 to the power received by the power-receiving module 3.

Figure 6:
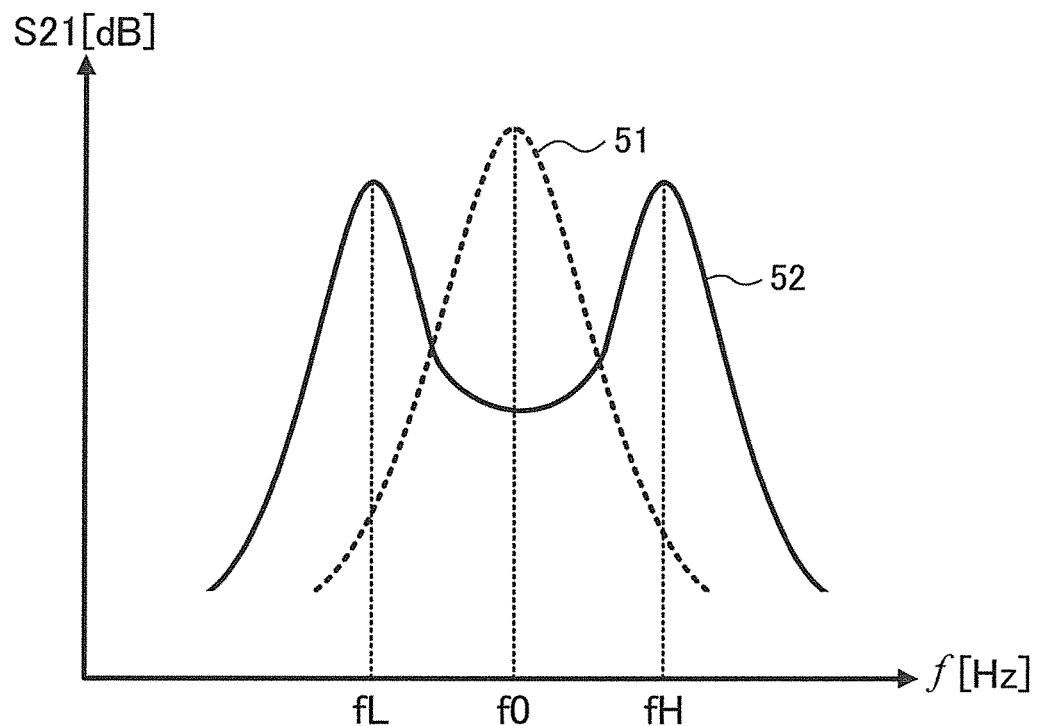
FIG. 6 is a graph indicating relation of transmission characteristic "S21" to a power-source frequency.

In the wireless power transmission apparatus 1 having the single-hump characteristic, the transmission characteristic "S21" is maximized (power transmission efficiency is maximized) when the power-source frequency is at the resonance frequency f0, as indicated by the dotted line 51 of FIG. 6.

On the other hand, in the wireless power transmission apparatus 1 having the double-hump characteristic, the transmission characteristic "S21" is maximized in a power-source frequency band (fL) lower than the resonance frequency f0 and in a power-source frequency band (fH) higher than the resonance frequency f0, as indicated by the full line 52 of FIG. 6.

It should be noted that, in general, if the distance between the power-supplying resonator and the power-receiving resonator is the same, the maximum value of the transmission characteristic "S21" having the double-hump characteristic (the value of the transmission characteristic "S21" at fL or fH) is lower than the value of the maximum value of the transmission characteristic "S21" having the single-hump characteristic (value of the transmission characteristic "S21" at f0) (See graph in FIG. 6).

To be more specific, if the power-source frequency of the AC power supplied to the power-supplying module 2 is set at a frequency fL around a peak on the low frequency side in the double-hump characteristic (in-phase resonance mode), the power-supplying resonator 22 and the power-receiving resonator 32 are in phase and resonated, with the result that the direction of the current flowing in the power-supplying resonator 22 is identical with the direction of the current flowing in the power-receiving resonator 32. As the result, as shown in the graph of FIG. 6, the value of the transmission characteristic S21 is made relatively high, even if the power-source frequency does not match with the resonance frequency of the power-supplying resonator 22 of the power-supplying module 2 and the power-receiving resonator 32 of the power-receiving module 3, although the value still may not be as high as that of the transmission characteristic S21 in wireless power transmission apparatuses in general aiming at maximizing the power transmission efficiency (see dotted line 51). In this regard, the resonance state in which the direction of the current flowing in the coil (power-supplying resonator 22) in the power-supplying module 2 is identical with the direction of the current flowing in the coil (power-receiving resonator 32) in the power-receiving module 3 are identical will be referred to as an in-phase resonance mode.

Further, in the in-phase resonance mode, because the magnetic field generated on the outer circumference side of the power-supplying resonator 22 and the magnetic field generated on the outer circumference side of the power-receiving resonator 32 cancel each other out, the magnetic field spaces each having a lower magnetic field strength than the magnetic field strengths in positions not on the outer circumference sides of the power-supplying resonator 22 and the power-receiving resonator 32 (e.g., the magnetic field strengths on the inner circumference sides of the power-supplying resonator 22 and the power-receiving resonator 32) are formed on the outer circumference sides of the power-supplying resonator 22 and the power-receiving resonator 32, as the influence of the magnetic fields is lowered. When a stabilizer circuit 7, a charging circuit 8, a lithium ion secondary battery 9, and the like desired to have less influence of the magnetic field are placed in this magnetic field space, occurrence of Eddy Current attributed to the magnetic field is restrained or prevented. This restrains negative effects due to generation of heat.

In the meanwhile, when, for example, the power-source frequency of the AC power supplied to the power-supplying module 2 is set at a frequency fH around a peak on the high frequency side in the double-hump characteristic (antiphase resonance mode), the power-supplying resonator 22 and the power-receiving resonator 32 are in antiphase and resonated, and hence the direction of the current flowing in the power-supplying resonator 22 is opposite to the direction of the current flowing in the power-receiving resonator 32. As the result, as shown in the graph of FIG. 6, the value of the transmission characteristic S21 is made relatively high, even if the power-source frequency does not match with the resonance frequency of the power-supplying resonator 22 of the power-supplying module 2 and the power-receiving resonator 32 of the power-receiving module 3, although the value still may not be as high as that of the transmission characteristic S21 in wireless power transmission apparatuses in general aiming at maximizing the power transmission efficiency (see dotted line 51). The resonance state in which the current in the coil (power-supplying resonator 22) in the power-supplying module 2 and the current in the coil (power-receiving resonator 32) of the power-receiving module 3 flow in directions opposite to each other is referred to as antiphase resonance mode.

Further, in the antiphase resonance mode, because the magnetic field generated on the inner circumference side of the power-supplying resonator 22 and the magnetic field generated on the inner circumference side of the power-receiving resonator 32 cancel each other out, the magnetic field spaces each having a lower magnetic field strength than the magnetic field strengths in positions not on the inner circumference side of the power-supplying resonator 22 and the power-receiving resonator 32 (e.g., the magnetic field strengths on the outer circumference side of the power-supplying resonator 22 and the power-receiving resonator 32) are formed on the inner circumference sides of the power-supplying resonator 22 and the power-receiving resonator 32, as the influence of the magnetic fields is lowered. When a stabilizer circuit 7, a charging circuit 8, a lithium ion secondary battery 9, and the like desired to have less influence of the magnetic field is placed in this magnetic field space, occurrence of Eddy Current attributed to the magnetic field is restrained or prevented. This restrains negative effects due to generation of heat. Further, since the magnetic field space formed in this antiphase resonance mode is formed on the inner circumference side of the power-supplying resonator 22 and the power-receiving resonator 32, assembling the electronic components such as the stabilizer circuit 7, the charging circuit 8, the lithium ion secondary battery 9, and the like within this space makes the wireless power transmission apparatus 1 itself more compact, and improves the freedom in designing.

Figure 7:
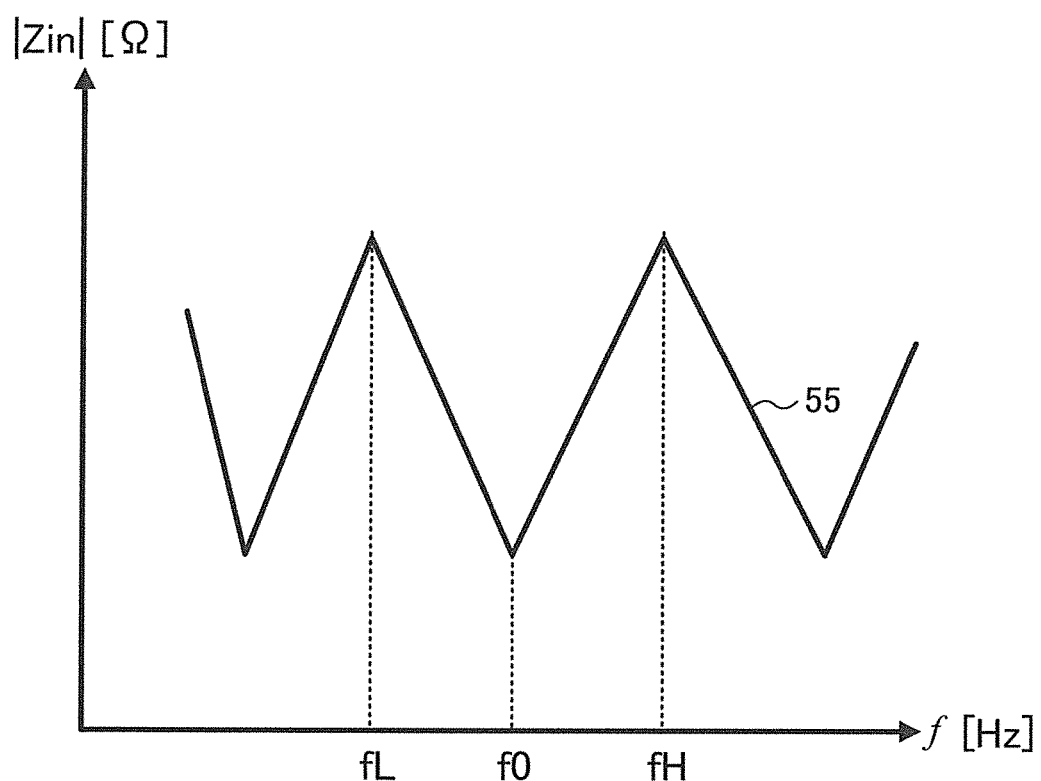
FIG. 7 is a graph showing an input impedance $Z_{in}$ to the power-source frequency.

When the transmission characteristic S21 of the wireless power transmission apparatus 1 relative to the power-source frequency of the power supplied to the wireless power transmission apparatus 1 has the double-hump characteristic as described above, the input impedance $Z_{in}$ of the wireless power transmission apparatus 1 is maximized while the power transmission efficiency is maintained at a high value as shown in FIG. 7 (see the full line 55) when the power-source frequency of the AC power supplied to the power-supplying module 2 is set in the in-phase resonance mode (fL) or in the antiphase resonance mode (fH). Furthermore, when the power-source frequency of the AC power supplied to the power-supplying module 2 is set at the resonance frequency (f0), the input impedance $Z_{in}$ of the wireless power transmission apparatus 1 is minimized as shown in FIG. 7 (see the full line 55). In Measurement Experiments 1-1 to 1-3, the current $I_{in}$ and the input impedance $Z_{in}$ when the charging (power supply) of the lithium ion secondary battery 9 was performed were measured while the power-source frequency of the AC power supplied to the power-supplying module 2 was changed to three states, i.e., the in-phase resonance mode (fL), the antiphase resonance mode (fH), and the resonance frequency (f0).

In the present embodiment, on condition that the transmission characteristic S21 of the wireless power transmission apparatus 1 relative to the power-source frequency of the power supplied to the wireless power transmission apparatus 1 has the double-hump characteristic, settings and combinations of the variable parameters of the power-supplying module 2 and the power-receiving module 3 such as resistance values, inductances, and capacities of capacitors of $R_1$, $L_1$, and $C_1$ of the RLC circuit of the power-supplying coil 21, $R_2$, $L_2$, and $C_2$ of the RLC circuit of the power-supplying resonator 22, $R_3$, $L_3$, and $C_3$ of the RLC circuit of the power-receiving resonator 32, and $R_4$, $L_4$, and $C_4$ of the RLC circuit of the power-receiving coil 31, and coupling coefficients $k_{12}$, $k_{23}$, and $k_{34}$ are design choices and can be optionally set.

(Measurement Experiment 1-1: Setting of Power-Source Frequency in in-Phase Resonance Mode)

In Measurement Experiment 1-1, the input current $I_{in}$ and the input impedance $Z_{in}$ relative to a charging time (Charging Time(min)) were measured when the power-source frequency of the AC power supplied to the power-supplying module 2 was set at a frequency fL around a peak on the low frequency side in the double-hump (in-phase resonance mode: fL=870 kHz). The measurement result is shown in FIG. 8. The input voltage $V_{in}$ was 5V (constant).

The measurement result in FIG. 8 shows that the input impedance $Z_{in}$ has a tendency to rise after the shift from the charging by the constant current (CC) to the charging by the constant voltage (CV).

According to Measurement Experiment 1-1 above, when the power-source frequency of the AC power supplied to the power-supplying module 2 is set at the frequency fL around a peak on the low frequency side in the double-hump after the transmission characteristic S21 of the wireless power transmission apparatus 1 relative to the power-source frequency of the power supplied to the wireless power transmission apparatus 1 is arranged to have the double-hump characteristic, the input impedance $Z_{in}$ after the shift from the constant current charging (CC) to the constant voltage charging (CV) has a tendency to rise. With this, by setting the predetermined threshold for determining whether the constant current charging period is finished at a value higher than the input impedance $Z_{in}$ in the constant current charging, such determination is enabled. Similarly, by setting the predetermined threshold for determining whether the constant current charging period is finished at a value higher than the load variation characteristic in the constant current charging, such determination is enabled.

(Measurement Experiment 1-2: Setting Power-Source Frequency in Antiphase Resonance Mode)

Figure 9:
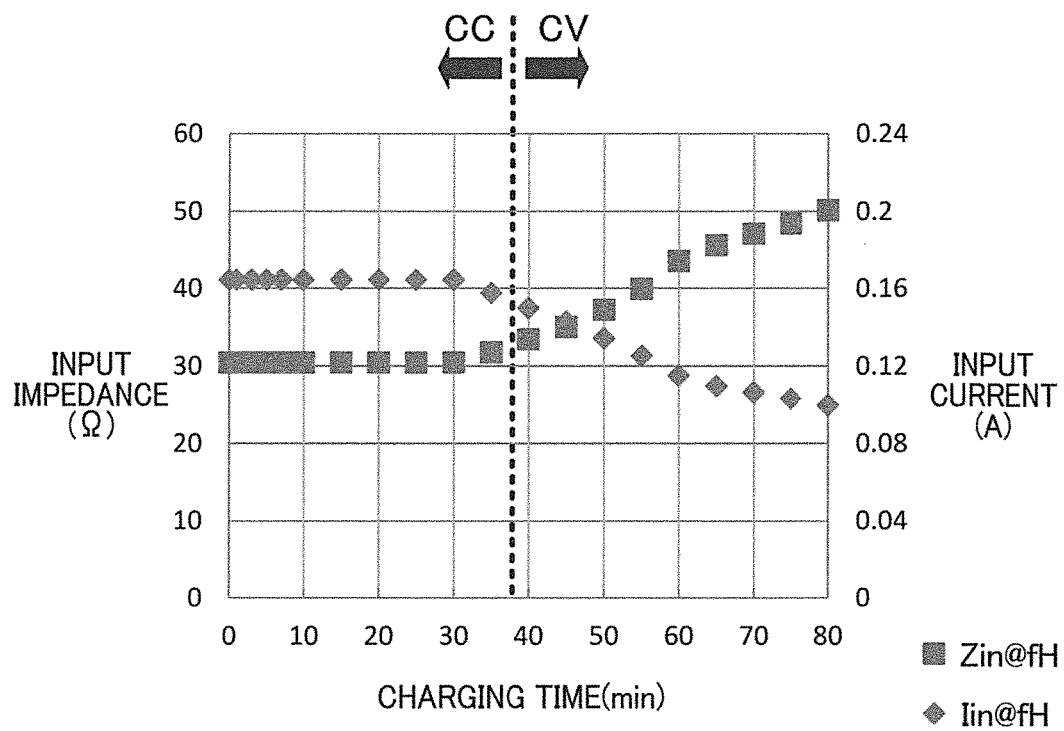
FIG. 9 is a graph showing a measurement result of Measurement Experiment 1-2.

In Measurement Experiment 1-2, the input current $I_{in}$ and the input impedance $Z_{in}$ relative to a charging time (Charging Time(min)) were measured when the power-source frequency of the AC power supplied to the power-supplying module 2 was set at a frequency fH around a peak on the high frequency side in the double-hump (antiphase resonance mode: fH=1070 kHz). The measurement result is shown in FIG. 9. The input voltage $V_{in}$ was 5V (constant).

The measurement result in FIG. 9 shows that the input impedance $Z_{in}$ has a tendency to rise after the shift from the constant current (CC) to the constant voltage charging (CV). According to Measurement Experiment 1-2 above, when the power-source frequency of the AC power supplied to the power-supplying module 2 is set at the frequency fH around a peak on the high frequency side in the double-hump after the transmission characteristic S21 of the wireless power transmission apparatus 1 relative to the power-source frequency of the power supplied to the wireless power transmission apparatus 1 is arranged to have the double-hump characteristic, the input impedance $Z_{in}$ after the shift from the constant current charging (CC) to the constant voltage charging (CV) has a tendency to rise. With this, by setting the predetermined threshold for determining whether the constant current charging period is finished at a value higher than the input impedance $Z_{in}$ in the constant current charging, such determination is enabled. Similarly, by setting the predetermined threshold for determining whether the constant current charging period is finished at a value higher than the load variation characteristic in the constant current charging, such determination is enabled.

(Measurement Experiment 1-3: Setting of Power-Source Frequency at Resonance Frequency)

Figure 10:
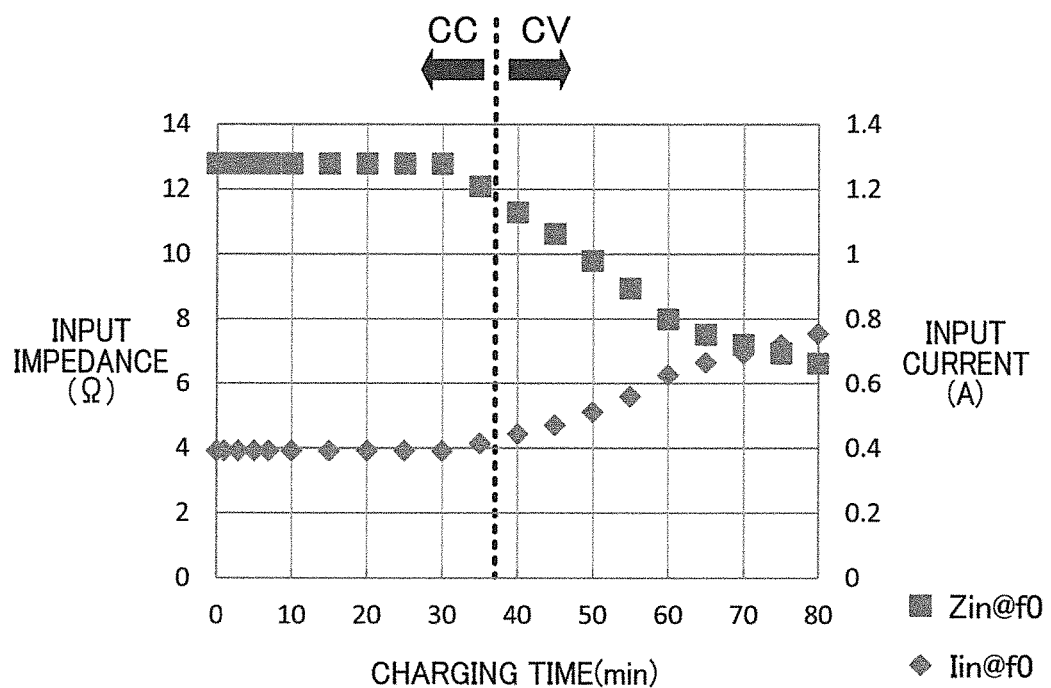
FIG. 10 is a graph showing a measurement result of Measurement Experiment 1-3.

In Measurement Experiment 1-3, the input current $I_{in}$ and the input impedance $Z_{in}$ relative to a charging time (Charging Time(min)) were measured when the power-source frequency of the AC power supplied to the power-supplying module 2 was set at a resonance frequency f0 in the double-hump (resonance frequency: f0=970 kHz). The measurement result is shown in FIG. 10. The input voltage $V_{in}$ was 5V (constant).

The measurement result in FIG. 10 shows that the input impedance $Z_{in}$ has a tendency to fall after the shift from the constant current charging (CC) to the constant voltage charging (CV).

According to Measurement Experiment 1-3 above, when the power-source frequency of the AC power supplied to the power-supplying module 2 is set at the resonance frequency f0 in the double-hump after the transmission characteristic S21 of the wireless power transmission apparatus 1 relative to the power-source frequency of the power supplied to the wireless power transmission apparatus 1 is arranged to have the double-hump characteristic, the input impedance $Z_{in}$ after the shift from the constant current charging (CC) to the constant voltage charging (CV) has a tendency to fall. With this, by setting the predetermined threshold for determining whether the constant current charging period is finished at a value lower than the input impedance $Z_{in}$ in the constant current charging, such determination is enabled. Similarly, by setting the predetermined threshold for determining whether the constant current charging period is finished at a value lower than the load variation characteristic in the constant current charging, such determination is enabled.

(Setting of Load Variation Characteristic)

Now, for example, when the variation tendency of the input impedance value of the wireless power transmission apparatus 1 in the constant voltage charging (CV) is set to the tendency to rise as in Measurement Experiment 1-1 above, the measurement accuracy of the voltage detector 4 (including the control device 5) is improved when the load variation characteristic which indicates an amount of change in the input impedance $Z_{in}$ of the wireless power transmission apparatus 1 to a charging time is increased, because a change in the load variation characteristic within a short time becomes large. The measurement accuracy indicates, for example, that the shift from the constant current charging (CC) to the constant voltage charging (CV) can be determined within a short time.

(Adjustment of Load Variation Characteristic by Coupling Coefficients)

In the present embodiment, the load variation characteristic is adjusted by changing the coupling coefficients $k_{12}$, $k_{23}$, and $k_{34}$. The following will explain in what manner the load variation characteristic is changed by changing the coupling coefficients $k_{12}$, $k_{23}$, and $k_{34}$, with reference to Measurement Experiments 2-1 to 2-5.

(Measurement Experiment 2-1)

The values of $R_1$, $R_2$, $R_3$, and $R_4$ in the wireless power transmission apparatus 1 used in the Measurement Experiment 2-1 were set at 0.65Ω, 0.65Ω, 2.47Ω, and 2.0Ω, respectively. Furthermore, the values of $L_1$, $L_2$, $L_3$, and $L_4$ were set at 3.1 ρH, 3.1 μH, 18.4 μH, and 12.5 μH, respectively. Furthermore, the resonance frequency of the power-supplying resonator 22 and the power-receiving resonator 32 was 970 kHz.

In Measurement Experiment 2-1, after the wireless power transmission apparatus 1 was set to have the double-hump characteristic by the arrangements above, the power-source frequency of the AC power supplied to the power-supplying module 2 is set in the antiphase resonance mode (fH). Furthermore, after the coupling coefficients $k_{23}$ and $k_{34}$ were fixed to 0.20 and 0.52, respectively, the input impedance $Z_{in}$ when the charging (power supply) of the lithium ion secondary battery 9 was performed was measured while the coupling coefficient $k_{12}$ was set at 0.3 and while the coupling coefficient $k_{12}$ was set at 0.46. In Measurement Experiment 2-1, the input impedance $Z_{in}$ with respect to a charging time (Charging Time(min)) when the input voltage $V_{in}$ from the AC power source 6 to the wireless power transmission apparatus 1 is 5V is measured.

Figure 11:
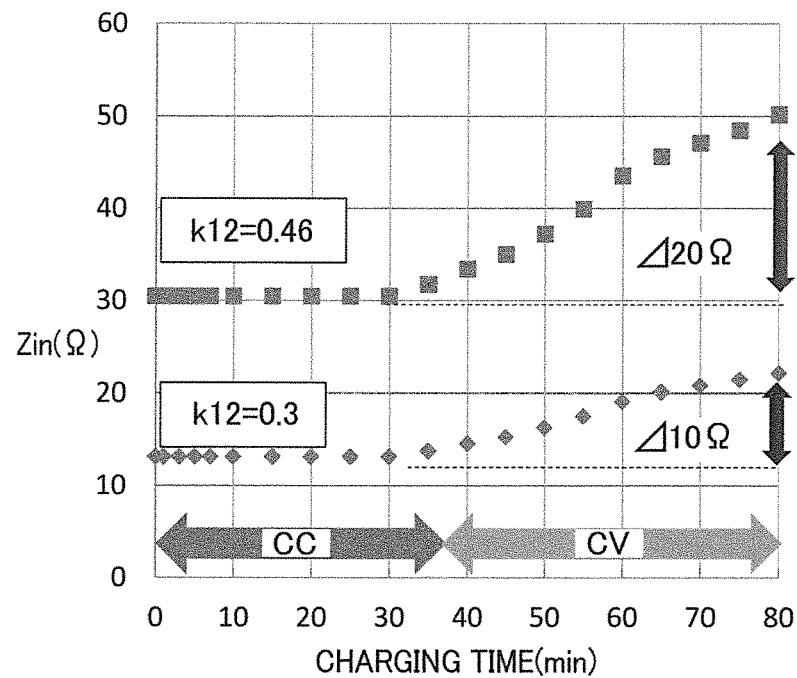
FIG. 11 is a graph showing measurement results of Measurement Experiment 2-1 and Measurement Experiment 2-2.
Figure 11:
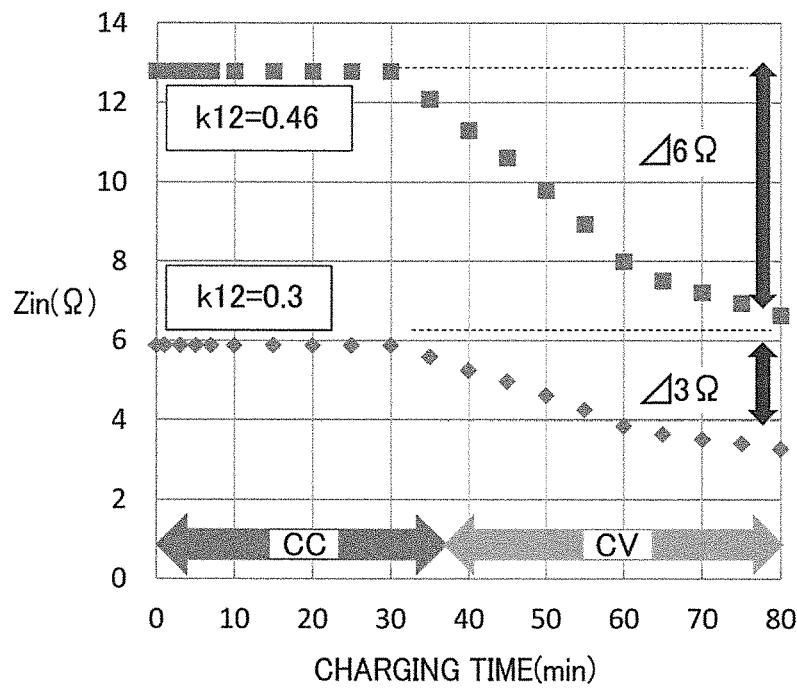

According to the measurement result of Measurement Experiment 2-1 shown in FIG. 11, while an amount of change in the input impedance $Z_{in}$ in the constant voltage charging (CV) with respect to the charging time is about 10Ω when the coupling coefficient $k_{12}$ is set at 0.3, an amount of change of the input impedance $Z_{in}$ in the constant voltage charging (CV) with respect to the charging time is about 20Ω when the coupling coefficient $k_{12}$ is set at 0.46. In this way, the load variation characteristic is larger when the coupling coefficient $k_{12}$ is set at 0.46 than when the coupling coefficient $k_{12}$ is set at 0.3.

(Measurement Experiment 2-2)

The wireless power transmission apparatus 1 used in Measurement Experiment 2-2 is identical with the wireless power transmission apparatus 1 used in Measurement Experiment 2-1. In Measurement Experiment 2-2, after the wireless power transmission apparatus 1 is arranged to have the double-hump characteristic, the power-source frequency of the AC power supplied to the power-supplying module 2 is set at the resonance frequency (f0) of the power-supplying resonator 22 and the power-receiving resonator 32. Furthermore, after the coupling coefficients $k_{23}$ and $k_{34}$ were fixed to 0.20 and 0.52, respectively, the input impedance $Z_{in}$ when the charging (power supply) of the lithium ion secondary battery 9 was performed was measured while the coupling coefficient $k_{12}$ was set at 0.3 and while the coupling coefficient $k_{12}$ was set at 0.46. In Measurement Experiment 2-2, as the power-source frequency of the AC power supplied to the power-supplying module 2 is set at the resonance frequency (f0) of the power-supplying resonator 22 and the power-receiving resonator 32, the input impedance $Z_{in}$ after the shift from the constant current charging (CC) to the constant voltage charging (CV) has a tendency to fall.

According to the measurement result of Measurement Experiment 2-2 shown in FIG. 11, while an amount of change in the input impedance $Z_{in}$ in the constant voltage charging (CV) with respect to the charging time is about 3Ω when the coupling coefficient $k_{12}$ is set at 0.3, an amount of change of the input impedance $Z_{in}$ in the constant voltage charging (CV) with respect to the charging time is about 6Ω when the coupling coefficient $k_{12}$ is set at 0.46. In this way, the load variation characteristic is larger when the coupling coefficient $k_{12}$ is set at 0.46 than when the coupling coefficient $k_{12}$ is set at 0.3. In this case, the inclination which is the amount of change in the input impedance $Z_{in}$ of the wireless power transmission apparatus 1 with respect to the charging time in the constant voltage charging is negative. However, the load variation characteristic in Measurement Experiment 2-2 is evaluated to be large, as the load variation characteristic is evaluated by the absolute value.

(Measurement Experiment 2-3)

The wireless power transmission apparatus 1 used in Measurement Experiment 2-3 is identical with the wireless power transmission apparatus 1 used in Measurement Experiment 2-1. In Measurement Experiment 2-2, after the wireless power transmission apparatus 1 is arranged to have the double-hump characteristic, the power-source frequency of the AC power supplied to the power-supplying module 2 is set in the antiphase resonance mode (fH). Furthermore, after the coupling coefficients $k_{12}$ and $k_{23}$ were fixed to 0.46 and 0.20, respectively, the input impedance $Z_{in}$ when the charging (power supply) of the lithium ion secondary battery 9 was performed was measured while the coupling coefficient $k_{34}$ was set at 0.25 and while the coupling coefficient $k_{34}$ was set at 0.52.

Figure 12:
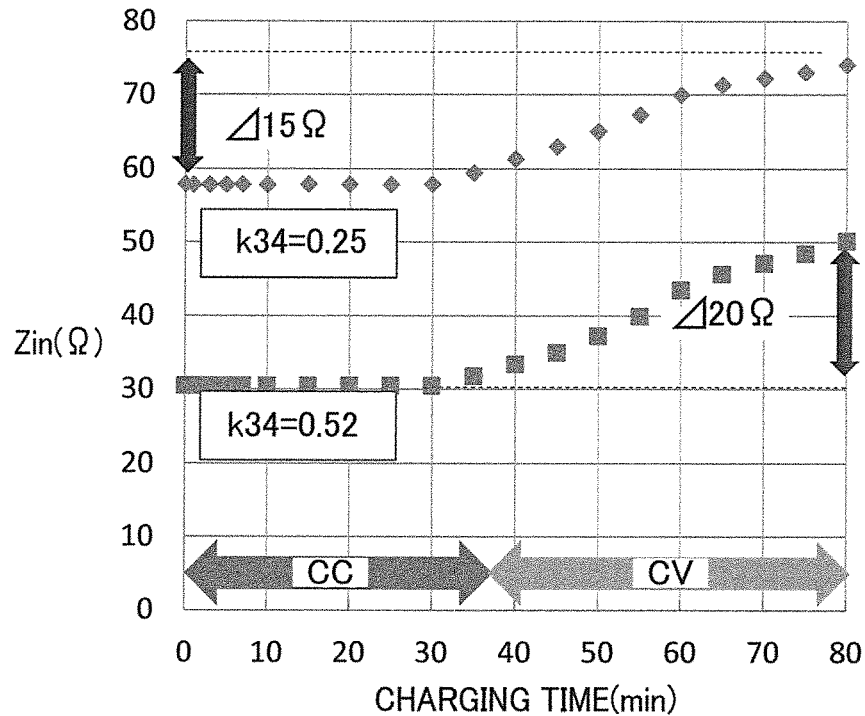
FIG. 12 is a graph showing measurement results of Measurement Experiment 2-3 and Measurement Experiment 2-4.
Figure 12:
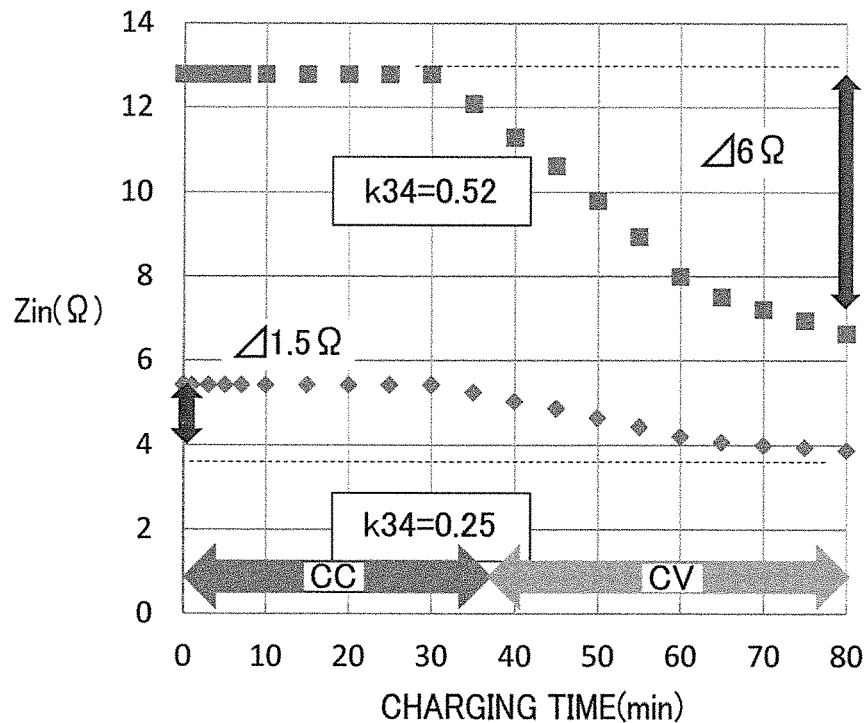

According to the measurement result of Measurement Experiment 2-3 shown in FIG. 12, while an amount of change in the input impedance $Z_{in}$ in the constant voltage charging (CV) with respect to the charging time is about 15Ω when the coupling coefficient $k_{34}$ is set at 0.25, an amount of change of the input impedance $Z_{in}$ in the constant voltage charging (CV) with respect to the charging time is about 20Ω when the coupling coefficient $k_{34}$ is set at 0.52. In this way, the load variation characteristic is larger when the coupling coefficient $k_{34}$ is set at 0.52 than when the coupling coefficient $k_{34}$ is set at 0.25.

(Measurement Experiment 2-4)

The wireless power transmission apparatus 1 used in Measurement Experiment 2-4 is identical with the wireless power transmission apparatus 1 used in Measurement Experiment 2-1. In Measurement Experiment 2-4, after the wireless power transmission apparatus 1 is arranged to have the double-hump characteristic, the power-source frequency of the AC power supplied to the power-supplying module 2 is set at the resonance frequency (f0) of the power-supplying resonator 22 and the power-receiving resonator 32. Furthermore, after the coupling coefficients $k_{12}$ and $k_{23}$ were fixed to 0.46 and 0.20, respectively, the input impedance $Z_{in}$ when the charging (power supply) of the lithium ion secondary battery 9 was performed was measured while the coupling coefficient $k_{34}$ was set at 0.25 and while the coupling coefficient $k_{34}$ was set at 0.52. In Measurement Experiment 2-4, in a manner similar to Measurement Experiment 2-2, as the power-source frequency of the AC power supplied to the power-supplying module 2 is set at the resonance frequency (f0) of the power-supplying resonator 22 and the power-receiving resonator 32, the input impedance $Z_{in}$ after the shift from the constant current charging (CC) to the constant voltage charging (CV) has a tendency to fall.

According to the measurement result of Measurement Experiment 2-4 shown in FIG. 12, while an amount of change in the input impedance $Z_{in}$ in the constant voltage charging (CV) with respect to the charging time is about 1.5Ω when the coupling coefficient $k_{34}$ is set at 0.25, an amount of change of the input impedance $Z_{in}$ in the constant voltage charging (CV) with respect to the charging time is about 6Ω when the coupling coefficient $k_{34}$ is set at 0.52. In this way, the load variation characteristic is larger when the coupling coefficient $k_{34}$ is set at 0.52 than when the coupling coefficient $k_{34}$ is set at 0.25.

(Measurement Experiment 2-5)

The values of $R_1$, $R_2$, $R_3$, and $R_4$ in the wireless power transmission apparatus 1 used in the Measurement Experiment 2-5 were set at 0.7Ω, 0.7Ω, 2.5Ω, and 2.0Ω, respectively. Furthermore, the values of $L_1$, $L_2$, $L_3$, and $L_4$ were set at 3.1 μH, 3.1 μH, 18.4 μH, and 12.5 μH. Furthermore, the values of $C_1$, $C_2$, $C_3$, and $C_4$ were set at 8.7 nF, 8.7 nF, 1.5 nF, and 2.3 nF. The resonance frequency of the power-supplying resonator 22 and the power-receiving resonator 32 were 970 kHz.

With the arrangement above, in Measurement Experiment 2-5, after the wireless power transmission apparatus 1 is arranged to have the double-hump characteristic, the power-source frequency of the AC power supplied to the power-supplying module 2 is set in the antiphase resonance mode (fH). Furthermore, after the coupling coefficient $k_{23}$ was fixed to 0.20, the input impedance $Z_{in}$ and the input current $I_{in}(I_1)$ when the charging (power supply) of the lithium ion secondary battery 9 was performed were measured while the coupling coefficient $k_{12}$ was set at 0.38 and the coupling coefficient $k_{34}$ was set at 0.37 and while the coupling coefficient $k_{12}$ was set at 0.46 and the coupling coefficient $k_{34}$ was set at 0.52. In Measurement Experiment 2-5, the input impedance $Z_{in}$ and the input current $I_{in}$ with respect to the charging time (Charging Time(min)) when the input voltage $V_{in}$ from the AC power source 6 to the wireless power transmission apparatus 1 is 5V are measured.

Figure 13:
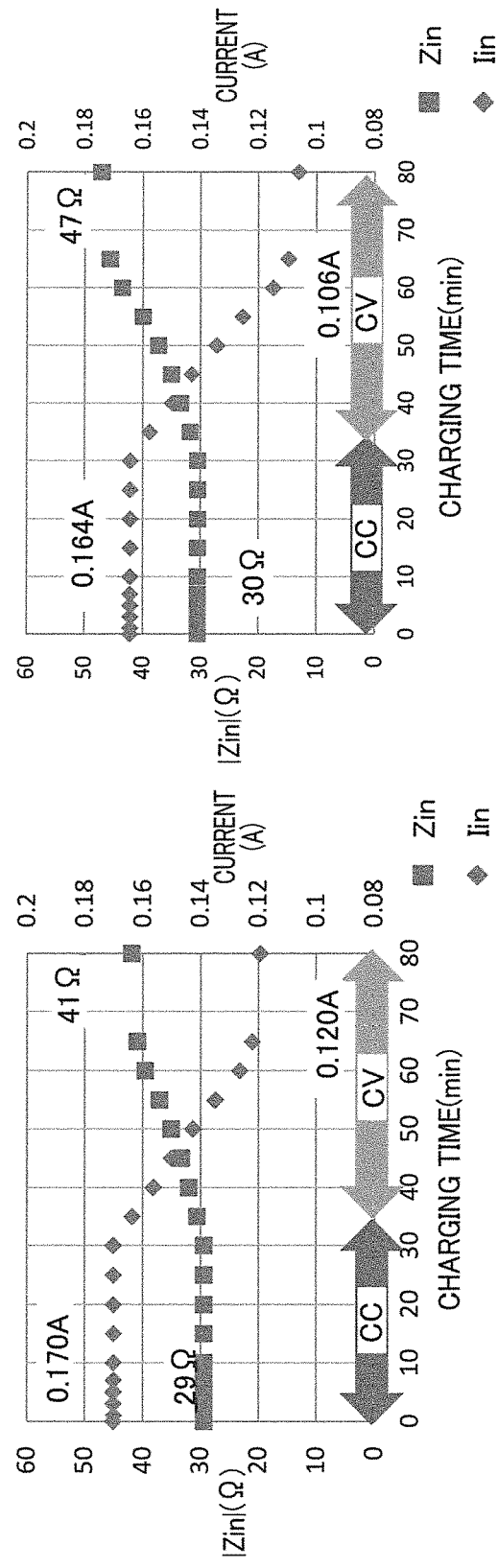
FIG. 13 is a graph showing a measurement result of Measurement Experiment 2-5.

According to the measurement result of the input impedance $Z_{in}$ in Measurement Experiment 2-5 shown in FIG. 13, when the coupling coefficient $k_{12}$ is 0.38 and the coupling coefficient $k_{34}$ is 0.37, an amount of change in the input impedance $Z_{in}$ with respect to the charging time at the shift from the constant current charging (CC) to the constant voltage charging (CV) is about 12Ω (41Ω–29Ω), whereas, when the coupling coefficient $k_{12}$ is 0.46 and the coupling coefficient $k_{34}$ is 0.52, an amount of change in the input impedance $Z_{in}$ with respect to the charging time in the constant voltage charging (CV) is about 17Ω (47Ω–30Ω). In this way, the load variation characteristic is larger when the coupling coefficient $k_{12}$ is set at 0.46 and the coupling coefficient $k_{34}$ is set at 0.52 than when the coupling coefficient $k_{12}$ is set at 0.38 and the coupling coefficient $k_{34}$ is set at 0.37.

As described above, the measurement accuracy of the voltage detector 4 (including the control device 5) is improved when the load variation characteristic is increased, because a change in the load variation characteristic within a short time becomes large.

(Method of Adjusting Coupling Coefficient)

Now, the following will describe a method of adjusting a coupling coefficient which is a parameter for adjusting the load variation characteristic above.

Figure 14:
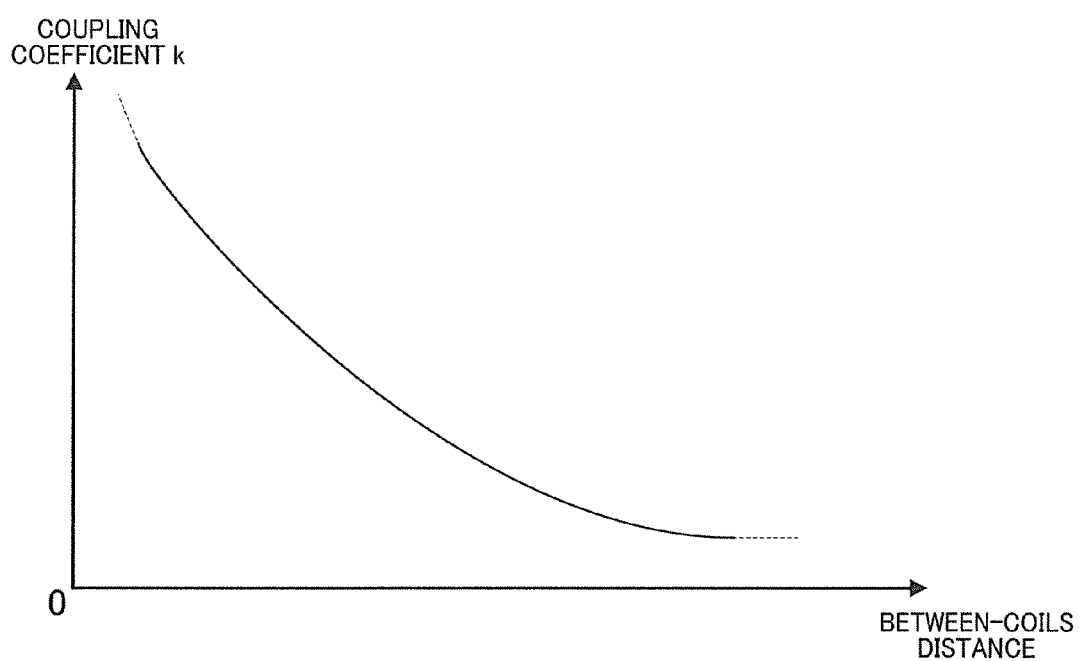
FIG. 14 is a graph showing the relationship between a between-coil distance and a coupling coefficient in wireless power transmission.

As shown in FIG. 14, in the wireless power transmission, the relationship between the distance between coils and the coupling coefficient k is such that the coupling coefficient k tends to increase as the distance between the coils is reduced (shortened). When this relationship is applied to the wireless power transmission apparatus 1 of the present embodiment, the coupling coefficient $k_{12}$ between the power-supplying coil 21 (coil $L_1$) and the power-supplying resonator 22 (coil $L_2$), the coupling coefficient $k_{23}$ between the power-supplying resonator 22 (coil $L_2$) and the power-receiving resonator 32 (coil $L_3$), and the coupling coefficient $k_{34}$ between the power-receiving resonator 32 (coil $L_3$) and the power-receiving coil 31 (coil $L_4$) are increased by reducing the distance d12 between the power-supplying coil 21 and the power-supplying resonator 22, the distance d23 between the power-supplying resonator 22 and the power-receiving resonator 32, and the distance d34 between the power-receiving resonator 32 and the power-receiving coil 31, respectively. In the meanwhile, the coupling coefficient $k_{12}$ between the power-supplying coil 21 (coil $L_1$) and the power-supplying resonator 22 (coil $L_2$), the coupling coefficient $k_{23}$ between the power-supplying resonator 22 (coil $L_2$) and the power-receiving resonator 32 (coil $L_3$), and the coupling coefficient $k_{34}$ between the power-receiving resonator (coil $L_3$) and the power-receiving coil 31 (coil $L_4$) are decreased by increasing the distance d12 between the power-supplying coil 21 and the power-supplying resonator 22, the distance d23 between the power-supplying resonator 22 and the power-receiving resonator 32, and the distance d34 between the power-receiving resonator 32 and the power-receiving coil 31, respectively.

(Charging Operation of Wireless Power Transmission Apparatus 1: Charging Operation Flow)

Figure 15:
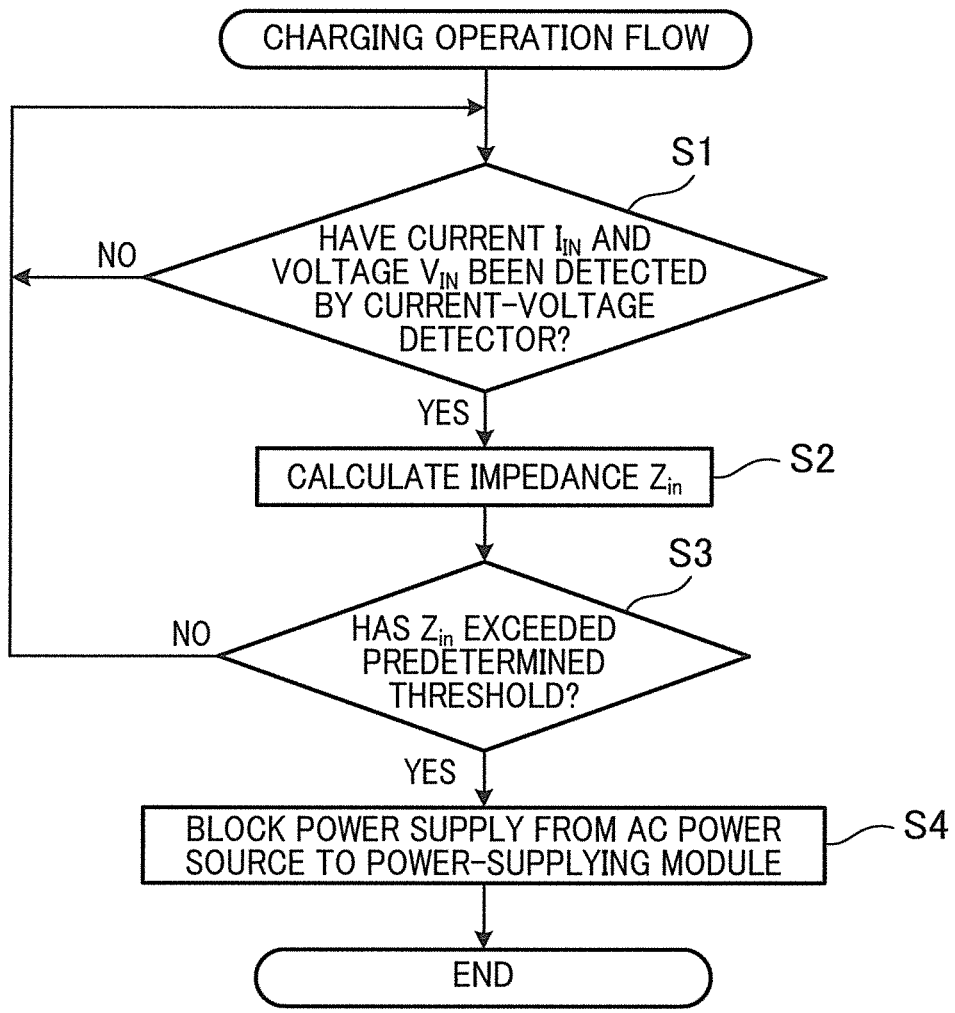
FIG. 15 is a flowchart illustrating a charging operation flow executed by a control device.

Based on the structure of the wireless power transmission apparatus 1 or the like, the charging operation of the lithium ion secondary battery 9 by utilizing the wireless power transmission apparatus 1 (supply power control method) will be described. To be more specific, a charging operation flow (process) executed mainly by the control device 5 in the wireless power transmission apparatus 1 will be described with reference to FIG. 15.

To begin with, as the wireless headset 102 is mounted on the charger 101, a magnetic field resonant state is creased as the power-supplying resonator 22 and the power-receiving resonator 32 are in resonance, and hence the power is supplied from the power-supplying resonator 22 to the power-receiving resonator 32 as magnetic field energy. As the power received by the power-receiving resonator 32 is supplied to the lithium ion secondary battery 9 via the power-receiving coil 31, the stabilizer circuit 7, and the charging circuit 8, the constant current charging (CC) starts. In this explanation, the charging amount of the lithium ion secondary battery 9 when the wireless headset 102 is mounted on the charger 101 is assumed to be 0%.

Subsequently, the control device 5 determines whether the voltage $V_{in}$ applied to the wireless power transmission apparatus 1 and the current $I_{in}$ input to the wireless power transmission apparatus 1 are detected by the current-voltage detector 4 (S1). The detection of the current $I_{in}$ and the voltage $V_{in}$ by the current-voltage detector 4 is performed at predetermined temporal intervals. (This predetermined temporal intervals can be optionally set.)

When the voltage $V_{in}$ and the current $I_{in}$ are not detected (S1: NO), a standby state is continued until the voltage $V_{in}$ and the current $I_{in}$ are detected.

In the meanwhile, when the voltage $V_{in}$ and the current $I_{in}$ are detected (S1: YES), the control device 5 calculates the input impedance $Z_{in}$ based on the voltage $V_{in}$ and the current $I_{in}$ detected by the current-voltage detector 4 (see Formula 5) (S2).

Then the control device 5 determines whether the input impedance $Z_{in}$ calculated in S2 exceeds a predetermined threshold (S3). When the input impedance $Z_{in}$ calculated in S2 does not exceed the predetermined threshold (S3: NO), the flow shifts to S1.

In the meanwhile, when the input impedance $Z_{in}$ calculated in S2 exceeds the predetermined threshold (S3: YES), the control device 5 blocks the power supply from the AC power source 6 to the power-supplying module 2 (S4). In other words, the charging of the lithium ion secondary battery 9 is terminated. The flow is finished at this stage.

For example, in case of the wireless power transmission apparatus 1 used in Measurement Experiment 1-1 shown in FIG. 8, when the threshold is set at 25Ω, while the input impedance $Z_{in}$ is more or less maintained at 22Ω in the constant current charging (CC), the input impedance $Z_{in}$ increases after the shift to the constant voltage charging (CV). When the charging time is about 45 minutes, the input impedance $Z_{in}$ reaches 25Ω. At this stage, the control device 5 determines that the input impedance $Z_{in}$ calculated in S2 exceeds the predetermined threshold (25Ω), and blocks the power supply from the AC power source 6 to the power-supplying module 2 so as to terminate the charging of the lithium ion secondary battery 9.

The flow above is a charging operation flow when it is determined that the constant current charging period is finished when the input impedance $Z_{in}$ exceeds the predetermined threshold. In the meanwhile, when it is determined that the constant current charging period is finished when the load variation characteristic exceeds a predetermined threshold, the load variation characteristic is calculated in S2, and when the load variation characteristic exceeds the predetermined threshold (S3), the control device 5 blocks the power supply from the AC power source 6 to the power-supplying module 2 (S4) so as to terminate the charging of the lithium ion secondary battery 9.

(Effects)

According to the configuration and method above, when the lithium ion secondary battery 9 chargeable with the shift from the constant current charging (CC) to the constant voltage charging (CV) is charged by using resonance phenomenon, the control device 5 determines that the constant current charging period (CC) is finished when there is a change in the input impedance $Z_{in}$ calculated based on the current $I_{in}$ and the voltage $V_{in}$ measured by the current-voltage detector 4, and terminates the charging of the lithium ion secondary battery 9 at the finish of the constant current charging period (CC).

The life of the lithium ion secondary battery 9 is typically elongated when, instead of repeating the charging to the full amount, charging which is terminated a while before reaching the full amount is repeated. Because the charging of the lithium ion secondary battery 9 is terminated at the end of the constant current charging period (CC) as above, the charging terminated a while before reaching the full amount becomes possible, and hence the life of the lithium ion secondary battery 9 is elongated. Typically, the lithium ion secondary battery 9 chargeable by constant current-constant voltage charging is charged to about 80% of the full amount in only the constant current charging period (CC), and hence the charging amount is sufficient.

Furthermore, because the charging of the lithium ion secondary battery 9 is terminated at the end of the constant current charging period (CC) without performing the constant voltage charging (CV), the charging time is shortened.

In addition to the above, according to the configuration above, it is determined that the constant current charging period (CC) is finished when the input impedance $Z_{in}$ calculated based on the current $I_{in}$ and the voltage $V_{in}$ measured by the current-voltage detector 4 exceeds a predetermined threshold.

In addition to the above, according to the configuration above, it is determined that the constant current charging period (CC) is finished when the load variation characteristic calculated based on the current $I_{in}$ and the voltage $V_{in}$ measured by the current-voltage detector 4 exceeds a predetermined threshold.

In addition to the above, according to the configuration above, the load variation characteristic is adjustable by adjusting at least one of the coupling coefficient $k_{12}$ between the power-supplying coil 21 and the power-supplying resonator 22, the coupling coefficient $k_{23}$ between the power-supplying resonator 22 and the power-receiving resonator 32, and the coupling coefficient $k_{34}$ between the power-receiving resonator 32 and the power-receiving coil 31. With this, because, for example, a change in the load variation characteristic within a short time becomes great when the load variation characteristic is increased, the measurement accuracy by the voltage detector 4 (including the control device 5) is improved.

In addition to the above, according to the configuration above, the load variation characteristic is increased by increasing the coupling coefficient $k_{12}$ between the power-supplying coil 21 and the power-supplying resonator 22. Because a change in the load variation characteristic within a short time becomes great by this, the measurement accuracy of the voltage detector (including the control device 5) is improved.

In addition to the above, according to the configuration above, the load variation characteristic is increased by increasing the coupling coefficient $k_{34}$ between the power-receiving resonator 32 and the power-receiving coil 31. Because a change in the load variation characteristic within a short time becomes great by this, the measurement accuracy of the voltage detector 4 (including the control device 5) is improved.

In addition to the above, according to the configuration above, the coupling coefficient $k_{12}$ between the power-supplying coil 21 and the power-supplying resonator 22 and the coupling coefficient $k_{34}$ between the power-receiving resonator 32 and the power-receiving coil 31 are increased. Because a change in the load variation characteristic within a short time becomes great by this, the measurement accuracy of the voltage detector 4 (including the control device 5) is improved.

Other Embodiments

Although the above description of the manufacturing method deals with the wireless headset 102 as an example, the method is applicable to any devices having a secondary battery; e.g., tablet PCs, digital cameras, mobile phone phones, earphone-type music player, hearing aids, and sound collectors.

Further, although the above description assumes that the wireless power transmission apparatus 1 is mounted in a portable electronic device, the use of such modules is not limited to small devices. For Example, with a modification to the specifications according to the required power amount, the wireless power transmission apparatus 1 is mountable to a relatively large system such as a wireless charging system in an electronic vehicle (EV), or to an even smaller device such as a wireless endoscope for medical use.

Although the above descriptions have been provided with regard to the characteristic parts so as to understand the present invention more easily, the invention is not limited to the embodiments and the Examples as described above and can be applied to the other embodiments and Examples, and the applicable scope should be construed as broadly as possible. Furthermore, the terms and phraseology used in the specification have been used to correctly illustrate the present invention, not to limit it. Further, it will be obvious for those skilled in the art that the other structures, systems, methods or the like are possible, within the spirit of the invention described in the present specification.

Accordingly, it should be considered that claims cover equivalent structures, too, without departing from the technical idea of the present invention. In addition, it is desirable to sufficiently refer to already-disclosed documents and the like, in order to fully understand the objects and effects of the present invention.

REFERENCE SIGNS LIST

1 WIRELESS POWER TRANSMISSION APPARATUS
2 POWER-SUPPLYING MODULE
3 POWER-RECEIVING MODULE
4 CURRENT-VOLTAGE DETECTOR
5 CONTROL DEVICE
6 AC POWER SOURCE
7 STABILIZER CIRCUIT
8 CHARGING CIRCUIT
9 LITHIUM ION SECONDARY BATTERY
10 POWER-SUPPLIED DEVICE
21 POWER-SUPPLYING COIL
22 POWER-SUPPLYING RESONATOR
31 POWER-RECEIVING COIL
32 POWER-RECEIVING RESONATOR
102 WIRELESS HEADSET
101 CHARGER

The invention claimed is:

1. A wireless power transmission apparatus configured to supply power by resonance phenomenon from a power-supplying module connected with a power source to a power-receiving module connected with a power-supplied device including a secondary battery which is chargeable by a constant current-constant voltage charging system, the wireless power transmission apparatus comprising:
  an input impedance measuring apparatus configured to measure an input impedance of the wireless power transmission apparatus including the power-supplied device; and
  a control device configured to determine whether a constant current charging period is finished based on a change in the input impedance measured by the input impedance measuring apparatus, and terminate charging when it is determined that the constant current charging period is finished, wherein
  the power-supplying module includes at least a power-supplying coil and a power-supplying resonator, and the power-receiving module includes at least a power-receiving resonator and a power-receiving coil, and
  a load variation characteristic is adjustable by adjusting at least one of a coupling coefficient between the power-supplying coil and the power-supplying resonator, a coupling coefficient between the power-supplying resonator and the power-receiving resonator, and a coupling coefficient between the power-receiving resonator and the power-receiving coil.

2. The wireless power transmission apparatus according to claim 1, wherein, the control device determines that the constant current charging period is finished when the input impedance measured by the input impedance measuring apparatus becomes higher than or lower than a predetermined threshold.

3. The wireless power transmission apparatus according to claim 1, wherein, the control device determines that the constant current charging period is finished when the load variation characteristic becomes higher than or lower than a predetermined threshold, the load variation characteristic being an amount of change with respect to a charging time in the input impedance measured by the input impedance measuring apparatus.

4. The wireless power transmission apparatus according to claim 1, wherein, the load variation characteristic is increased by increasing the coupling coefficient between the power-supplying coil and the power-supplying resonator.

5. The wireless power transmission apparatus according to claim 1, wherein, the load variation characteristic is increased by increasing the coupling coefficient between the power-receiving resonator and the power-receiving coil.

6. The wireless power transmission apparatus according to claim 1, wherein, the load variation characteristic is increased by increasing the coupling coefficient between the power-supplying coil and the power-supplying resonator and the coupling coefficient between the power-receiving resonator and the power-receiving coil.

7. A supply power control method of a wireless power transmission apparatus for supplying, by changing a magnetic field, power from a power-supplying module connected with a power source to a power-receiving module connected with a power-supplied device including a secondary battery which is chargeable by a constant current-constant voltage charging system, the power-supplying module includes at least a power-supplying coil and a power-supplying resonator, and the power-receiving module includes at least a power-receiving resonator and a power-receiving coil, the wireless power transmission apparatus including:
  an input impedance measuring apparatus configured to measure an input impedance of the power transmission apparatus; and
  a control device, and
  the control device being configured to execute the steps of:
  determining whether a constant current charging period is finished, by utilizing a change in the input impedance measured by the input impedance measuring apparatus;
  terminating charging when it is determined that the constant current charging period is finished; and
  adjusting a load variation characteristic by adjusting at least one of a coupling coefficient between the power-supplying coil and the power-supplying resonator, a coupling coefficient between the power-supplying resonator and the power-receiving resonator, and a coupling coefficient between the power-receiving resonator and the power-receiving coil.

* * * * *